(12) United States Patent
Kim et al.

(10) Patent No.: US 10,620,828 B2
(45) Date of Patent: Apr. 14, 2020

(54) ELECTRONIC DEVICE HAVING COMBINED BUTTON

(71) Applicant: Samsung Electronics Co., Ltd., Gyeonggi-do (KR)

(72) Inventors: Minsik Kim, Gyeonggi-do (KR); Soyoung Kim, Gyeonggi-do (KR); Jongmoo Lee, Seoul (KR); Geonsoo Kim, Gyeonggi-do (KR); Jinwan An, Daegu (KR); Jiwoo Lee, Gyeongsangbuk-do (KR); Hyunsuk Choi, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/827,332

(22) Filed: Nov. 30, 2017

(65) Prior Publication Data

US 2018/0157411 A1    Jun. 7, 2018

(30) Foreign Application Priority Data

Dec. 1, 2016   (KR) .......................... 10-2016-0162565

(51) Int. Cl.
   *G06F 3/0488*   (2013.01)
   *G06K 9/00*    (2006.01)

(52) U.S. Cl.
   CPC ........ *G06F 3/04886* (2013.01); *G06F 3/0488* (2013.01); *G06K 9/0004* (2013.01);
   (Continued)

(58) Field of Classification Search
   CPC .... G06F 3/04886; G06F 3/0488; G06F 3/044; G06F 2203/0338; G06K 9/0004
   See application file for complete search history.

(56) References Cited

U.S. PATENT DOCUMENTS

2008/0254838 A1    10/2008  Wei et al.
2009/0295753 A1*   12/2009  King .................. G06F 3/03547
                                                 345/174
(Continued)

FOREIGN PATENT DOCUMENTS

EP    2 557 492 A1    2/2013
JP    2001-112073 A   4/2001
(Continued)

OTHER PUBLICATIONS

International Search Report dated Mar. 8, 2018.
European Search Report dated Aug. 26, 2019.

*Primary Examiner* — Matthew Ell
*Assistant Examiner* — Zelalem W Shalu
(74) *Attorney, Agent, or Firm* — Cha & Reiter, LLC

(57) ABSTRACT

An electronic device may include a housing including a first surface and a second surface, the first surface including a first opening and a second opening; a touch screen display being disposed and visible through the first opening; a mechanical button located at least in part of the second opening and movable in response to a pressure applied thereto; a processor located inside the housing and electrically coupled to the display and the mechanical button; and a memory located inside the housing and electrically coupled to the processor, wherein the memory stores a plurality of instructions that cause, upon execution, the processor to: display a screen on at least a portion of the touch screen display; display a virtual button comprising a graphical user interface (GUI) on a specific region of the screen adjacent to the mechanical button such that the GUI visually extends the mechanical button.

10 Claims, 19 Drawing Sheets

(a)

(b)

(c)

(d)

(52) U.S. Cl.
 CPC .... *G06F 2203/0338* (2013.01); *G06K 9/0002* (2013.01); *G06K 9/00006* (2013.01)

(56) References Cited

U.S. PATENT DOCUMENTS

| | | |
|---|---|---|
| 2011/0038114 A1 | 2/2011 | Pance et al. |
| 2011/0074708 A1 | 3/2011 | Oguri |
| 2011/0148756 A1 | 6/2011 | Oross et al. |
| 2011/0285651 A1 | 11/2011 | Temple |
| 2013/0038544 A1 | 2/2013 | Park |
| 2013/0044341 A1 | 2/2013 | Uchino |
| 2013/0215048 A1 | 8/2013 | Jang |
| 2013/0231162 A1* | 9/2013 | Lee .................. G06F 1/1624 455/566 |
| 2014/0062887 A1 | 3/2014 | Lee et al. |
| 2014/0157203 A1* | 6/2014 | Jeon .................. G06F 3/0482 715/840 |
| 2015/0221287 A1 | 8/2015 | Badawiyeh |
| 2015/0331451 A1* | 11/2015 | Shin .................. G06F 3/041 345/173 |
| 2016/0364593 A1 | 12/2016 | Lee et al. |
| 2017/0003879 A1 | 1/2017 | Tamai et al. |

FOREIGN PATENT DOCUMENTS

| | | |
|---|---|---|
| KR | 10-2013-0095478 A | 8/2013 |
| KR | 10-2014-0128738 A | 11/2014 |
| KR | 10-2015-0055643 A | 5/2015 |
| TW | M513411 U | 12/2015 |
| WO | 03/080391 A2 | 10/2003 |
| WO | 2014/065812 A1 | 5/2014 |
| WO | 2016/104767 A1 | 6/2016 |

\* cited by examiner

FIG. 7
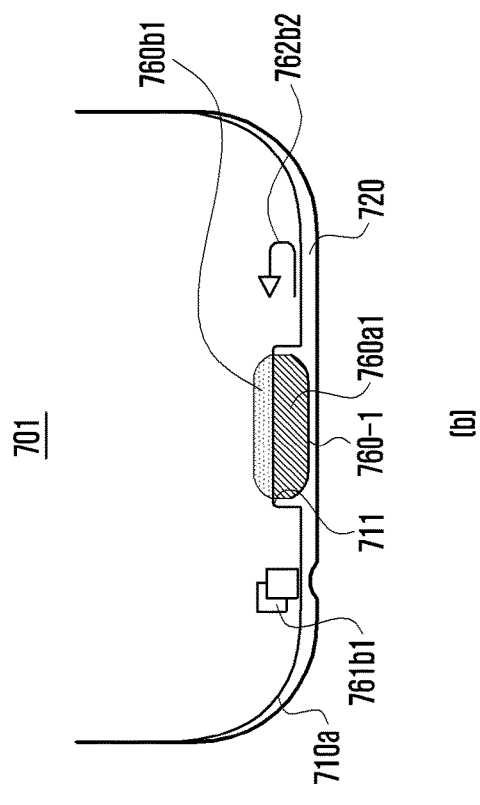
(a)
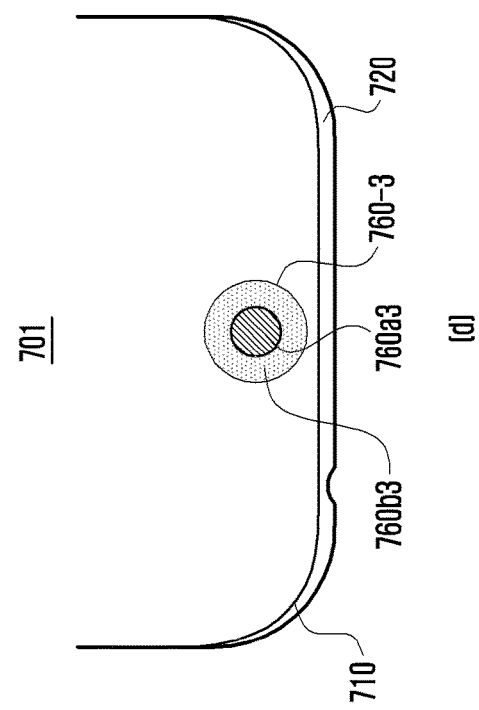
(b)
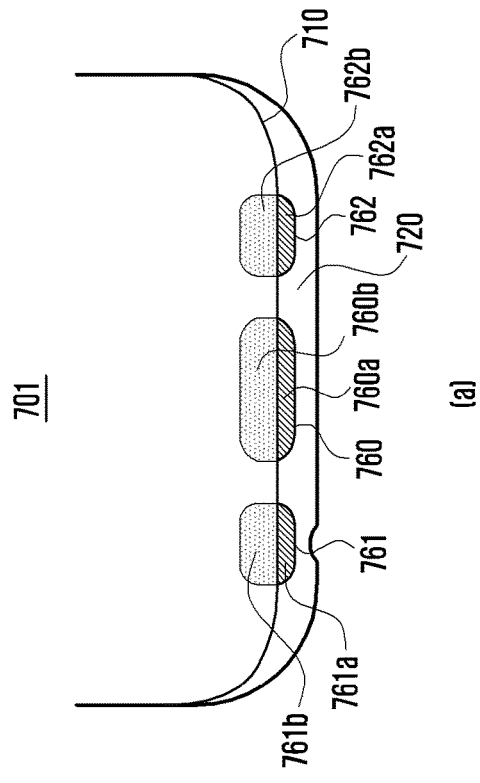
(c)
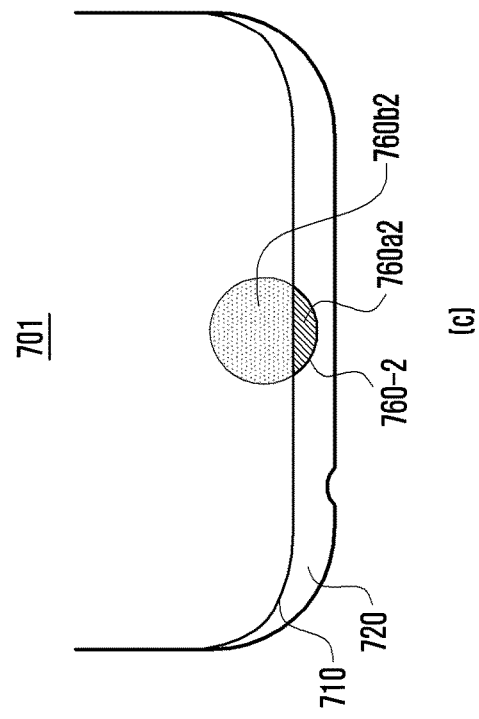
(d)

ELECTRONIC DEVICE HAVING COMBINED BUTTON

CLAIM OF PRIORITY

This application claims the benefit under 35 U.S.C. § 119(a) of a Korean patent application filed on Dec. 1, 2016 in the Korean intellectual property office and assigned serial number 10-2016-0162565, the entire disclosure of which is hereby incorporated by reference.

TECHNICAL FIELD

The present disclosure generally relates to an electronic device having a combined mechanical and virtual button and a method for controlling the combined button.

BACKGROUND

With dramatic advances in technology, an electronic device not only provides traditional services and functions such as telephony and data transmission, but also provides a great variety of services and functions through multitasking or various applications.

Typically, an electronic device has a screen on a front surface thereof. Using the screen which gradually increases in size, the electronic device can provide various services to the user. However, the screen size of the electronic device is limited by a camera, a receiver, and a sensor, located at an upper portion of the front surface, or a button located at a lower portion of the front surface.

Accordingly, there is a need for technique to increase the screen size of the electronic device and to reduce the size of the button located under the screen.

SUMMARY

According to one embodiment of the present disclosure, an electronic device may comprise a housing including a first surface facing a first direction and a second surface facing a second direction, the first direction being opposite that of the second direction, the first surface including a first opening and a second opening; a touch screen display being disposed and visible through the first opening; a mechanical button located at least in part of the second opening and movable in response to a pressure applied thereto; a processor located inside the housing and electrically coupled to the display and the mechanical button; and a memory located inside the housing and electrically coupled to the processor, wherein the memory stores a plurality of instructions that cause, upon execution, the processor to: display a screen on at least a portion of the touch screen display; display a graphical user interface (GUI) on a specific region of the screen adjacent to the mechanical button such that the GUI visually extends the mechanical button.

The mechanical button may have a first shape and the GUI may have a second shape. The second shape may be disposed about the first shape to form a third larger shape. The mechanical button may have a first color and the GUI has a second color, the first and second colors being different. When the processor receives a touch input through the specific region of the screen, a corresponding function associated with the mechanical button is activated in response to the touch input. A fingerprint sensor may be disposed in the specific region where the GUI is displayed.

An electronic device may comprise a housing including a first surface facing a first direction and a second surface facing a second direction, the first direction being opposite that of the second direction, the first surface including a first opening and a second opening; a touch screen display being disposed and visible through the first surface; a mechanical button located at least in part of the second opening and movable in response to a pressure applied thereto, the mechanical button having a corresponding function; a processor located inside the housing and electrically coupled to the touch screen display and the mechanical button; and a memory located inside the housing and electrically connected to the processor. The memory stores a plurality of instructions that cause, upon execution, the processor to: display a virtual button on at least a portion of the touch screen display, and display a graphical user interface (GUI) on a specific region of the screen, the virtual button being configured to perform the corresponding function of the mechanical button, wherein the GUI visually enlarges the mechanical button. The mechanical button may have a circular shape and the GUI may have a circular band shape surrounding the mechanical button. The mechanical button has a first color and the GUI has a second color, the first and second colors being different. When the processor receives a touch input through the specific region of the screen, a corresponding function associated with the mechanical button is activated in response to the touch input. A fingerprint sensor may be disposed in the specific region where the GUI is displayed.

According to various embodiments of the present disclosure, the electronic device having a combined button implemented as a combination of a physical button and a virtual button in response to an increase in screen size is provided together with a method for controlling the combined button.

These and further embodiments of the present disclosure are more fully described herein with reference to the accompanying figures in which like reference characters refer to similar elements.

BRIEF DESCRIPTION OF THE DRAWINGS

FIGS. 7(*a*)-(*d*) is a diagram illustrating examples of a combined button of an electronic device according to one embodiment.

DETAILED DESCRIPTION

Figure 1:
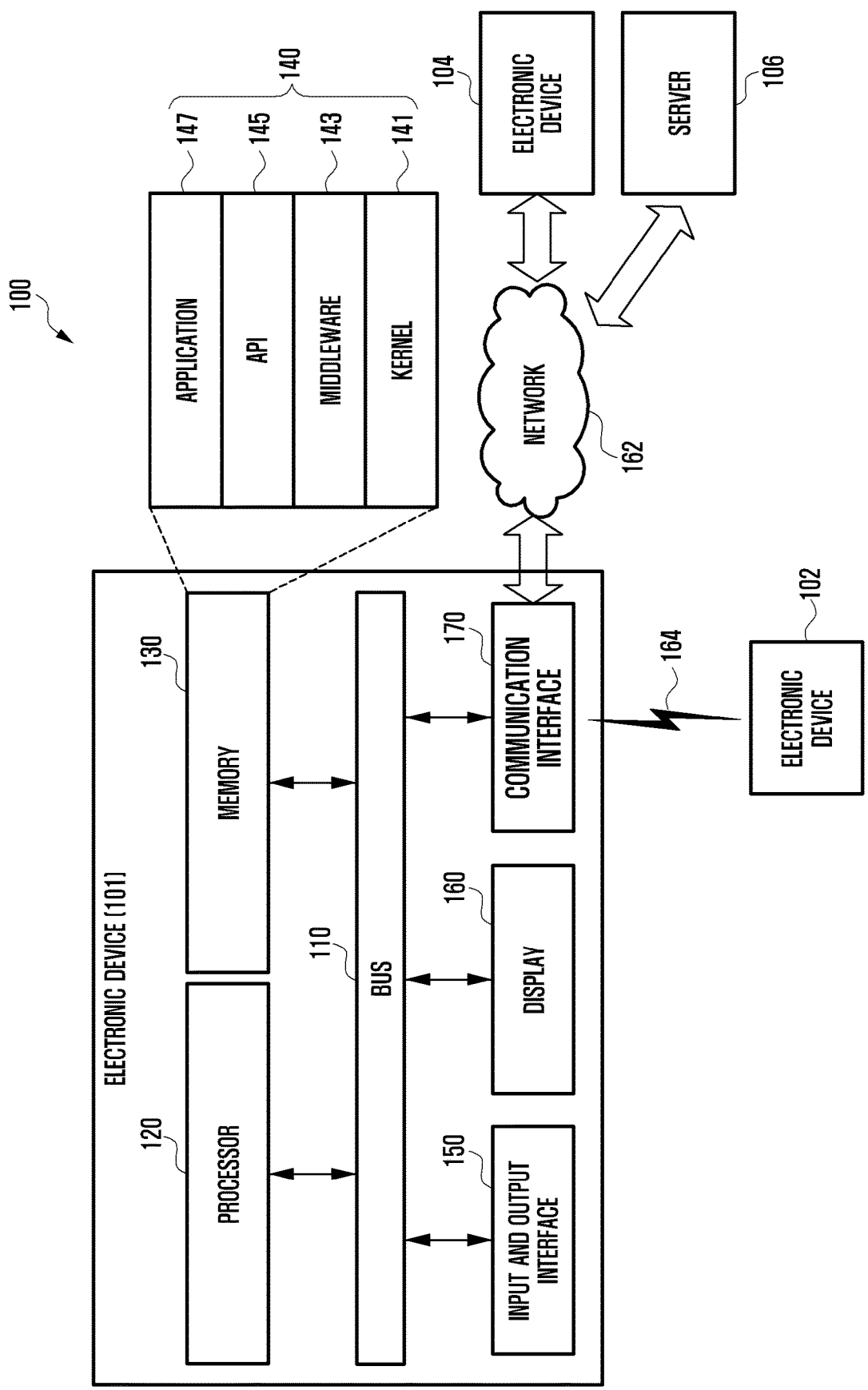
FIG. 1 is a diagram illustrating a network environment including an electronic device according to various embodiments of the present disclosure.

Hereinafter, various example embodiments of the present disclosure are described in greater detail with reference to the accompanying drawings. In the following description of embodiments, descriptions of well-known functions and structures incorporated herein may be omitted to avoid obscuring the subject matter of the present disclosure and for clarity and conciseness.

The following description with reference to the accompanying drawings is provided to assist in an understanding of embodiments of the present disclosure as defined by the claims and their equivalents. The following description includes various specific details to assist in that understanding but these are to be regarded as mere examples. Various changes and modifications of the embodiments described herein can be made without departing from the scope and spirit of the present disclosure.

Expressions such as "include" and "may include", as used herein, may indicate the presence of the disclosed functions, operations, and constituent elements, but do not limit one or more additional functions, operations, and constituent elements. Herein, terms such as "include" and/or "have" may be construed to indicate a certain characteristic, number, step, operation, constituent element, component or a combination thereof, but may not be construed to exclude the existence of, or a possibility of, one or more other additional characteristics, numbers, steps, operations, constituent elements, components or combinations thereof.

In the present disclosure, the expression "and/or" includes any and all combinations of the associated listed words. For example, the expression "A and/or B" may include A, include B, or both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions merely distinguish an element from the other elements. For example, a first user device and a second user device indicate different user devices although both devices are user devices. For example, a first element could be referred to as a second element, and similarly, a second element could also be referred to as a first element without departing from the scope of the present disclosure.

When is referred to as being "connected" to or "accessed" by to other component, not only is the component directly connected to or accessed by the other component, but also there may exist another component between them. Meanwhile, when a component is referred to as being "directly connected" or "directly accessed" to other component, it should be understood that there is no component therebetween.

The terms used in the present disclosure are merely used to describe specific embodiments of the present disclosure, and are not intended to limit the present disclosure. As used herein, the singular forms of terms are intended to include the plural forms as well, unless the context clearly indicates otherwise.

In this disclosure, an electronic device may be able to perform a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch), or the like, but is not limited thereto.

According to some embodiments of the present disclosure, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), avionics, security equipment, or an industrial or home robot, or the like, but is not limited thereto.

According to some embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. The above-mentioned electronic devices are merely listed as examples and not to be considered as a limitation of this disclosure.

FIG. 1 is a diagram illustrating an example network environment including electronic devices according to an illustrative embodiment of the present disclosure.

With reference to FIG. 1, a network environment 100 includes the electronic device 101. The electronic device 101 may include a bus 110, a main processor (e.g., including processing circuitry) 120, a memory 130, an input/output interface (e.g., including input/output circuitry) 150, a display 160, a communication interface (e.g., including communication circuitry) 170, a sub-processor (e.g., including processing circuitry) 180, and/or a camera module (e.g., including a camera) 190.

The bus 110 may be a circuit designed for connecting the above-discussed elements and communicating data (e.g., a control message) between such elements.

The main processor 120 may include various processing circuitry configured to receive commands from the other elements (e.g., the memory 130, the input/output interface 150, the display 160, or the communication interface 170, etc.) through the bus 110, interpret the received commands, and perform the arithmetic or data processing based on the interpreted commands.

The memory 130 may store therein commands or data received from or created at the main processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the main processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may operate between the kernel 141 and either one or both of the API 145 and the application 147, in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the main processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various input/output circuitry configured to deliver commands or data, entered by a user through an input/output unit (e.g., including various input/output circuitry, such as, for example, and without limitation, a sensor, a keyboard, or a touch screen), to the main processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display, and/or the like, but is not limited thereto. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may include various communication circuitry and may perform a communication between the electronic device 101 and an external electronic device (e.g., the electronic device 104 of the server 106). For example, the communication interface 170 may communicate with any external device by being connected with a network 162 through a wired or wireless communication or via short-range wireless communication 164.

The wireless communication may include, but not limited to, at least one of Wi-Fi, Bluetooth (BT), near field communication (NFC), global navigation satellite system (GNSS), or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.).

GNSS may include at least one of GPS, global navigation satellite system (Glonass), Beidou Navigation Satellite System (Beidou), Galileo, or the European global satellite-based navigation system. The terms "GPS" and the "GNSS" may be used interchangeably herein.

The wired communication may include, but not limited to, at least one of universal serial bus (USB), high definition multimedia interface (HDMI)), recommended standard 232 (RS-232), or plain old telephone service (POTS).

The network 162 includes, as a telecommunications network, at least one of a computer network (e.g., a local area network (LAN) or a wide area network (WAN)), the Internet, and a telephone network.

The sub-processor 180 may include various processing circuitry and be an exclusive processor for processing data from the camera module 190. For example, the sub-processor 180 may be a specialized processor for processing 3D image data that has a heavy processing load. For example, the sub-processor 180 may be implemented as various processing circuitry, such as, for example, and without limitation, a dedicated processor, a CPU, an Application-Specific Integrated Circuit (ASIC), or the like. The sub-processor 180 may generate the 3D data requested by the main processor 120 based on the raw data received from the camera module 190. The sub-processor 180 may generate data frames based on the 3D data and transmit the data frames to the main processor 120.

According to an embodiment, the sub-processor 180 may acquire censor data at the time of acquiring 3D data. For example, the sub-processor 180 may acquire the location information (e.g., X, Y, and Z coordinates) and posture information (e.g., orientation (landscape or portrait), rotation, and movement) of the electronic device 101 or an external camera module by various sensors (e.g., gyro sensor, geomagnetic sensor, and/or acceleration sensor). The sub-processor 180 may generate data frames to the main processor 120 based on the 3D data and sensor data.

The camera module 190 may include at least one camera configured to take a 3D image. For this image, the camera module 190 may include a 3D camera and an RGB camera. The 3D camera and the RGB camera may be functionally connected to the sub-processor 180. The 3D camera is functionally connected to the sub-processor 180, and the RGB camera is functionally connected to the main processor 120.

The first and second external electronic devices 102 and 104 may be of the same or different types of electronic device as the type of the electronic device 101. The server 106 may include a group of one or more servers.

Some or all of operations performed in the electronic device 101 may be performed in one or more other electronic devices 102 or 104 or the server 106. When the electronic device 101 performs a certain function or service automatically or in response to a request, the electronic device 101 may request at least a portion of functions related to the function or service from another electronic device 102 or 104 or the server 106 instead of or in addition to performing the function or service for itself. Either of the other electronic devices 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Although FIG. 1 is directed to the electronic device 101 including the sub-processor 180 and the camera module 190, the configuration of the electronic device is not limited thereto. For example, the sub-processor 180 and the camera module 190 may be implemented in the form of a separate external device connected to the electronic device 101 through a wired/wireless link.

Figure 2:
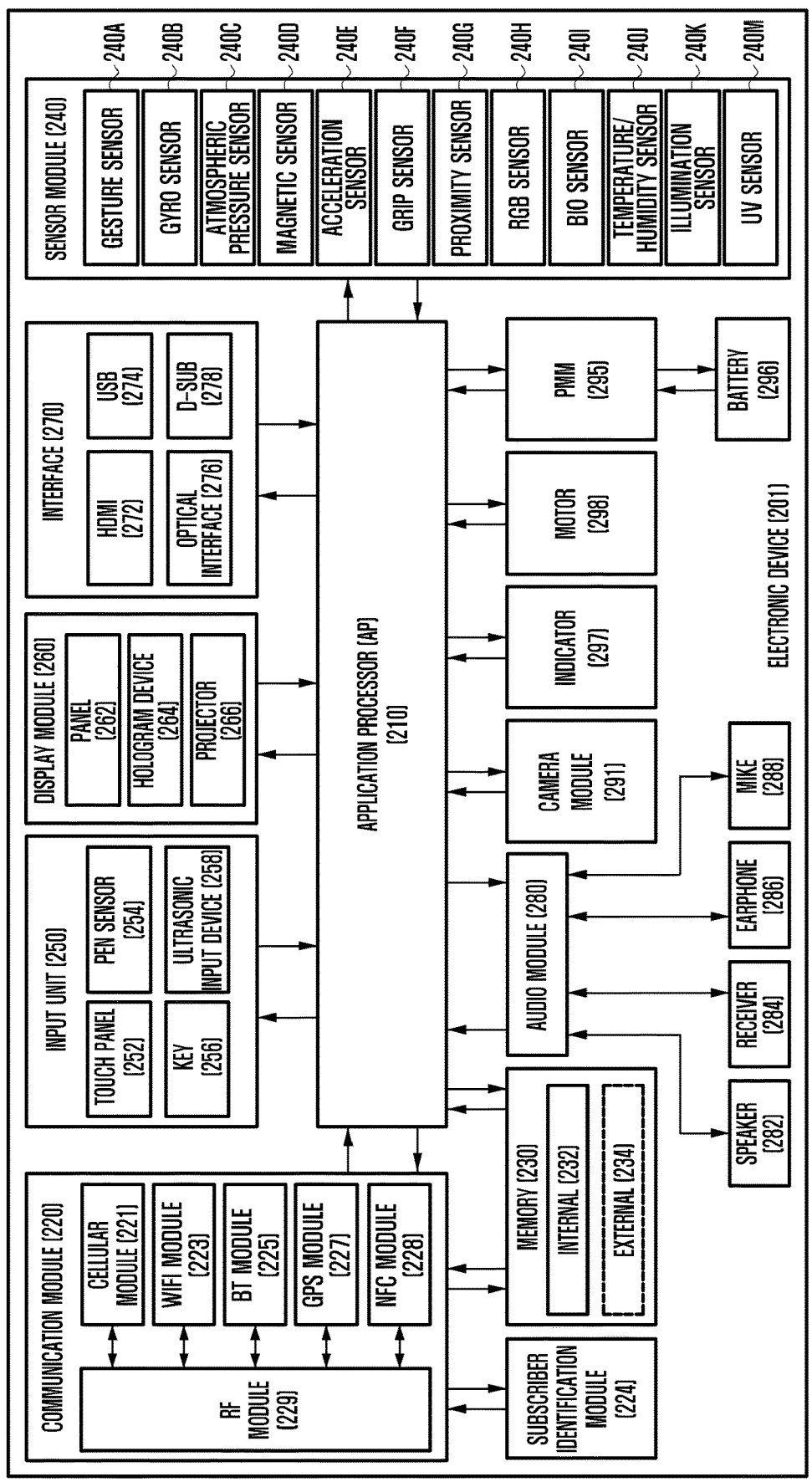
FIG. 2 is a block diagram illustrating an electronic device according to an embodiment.

FIG. 2 is a block diagram illustrating an example electronic device according to an example embodiment of the present disclosure.

Referring to FIG. 2, an electronic device 201 may form, for example, all or a part of the electronic device 101 illustrated in FIG. 1. the electronic device 201 may include at least one main application processor (AP) (e.g., including processing circuitry) 210, a sub-application processor (e.g., including processing circuitry) 215, a communication module (e.g., including communication circuitry) 220, a subscriber identification module (SIM) module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and/or a motor 298.

The main AP 210 may include various processing circuitry configured to drive an operating system or applications, control a plurality of hardware or software components connected thereto, and may also perform processing and operation for various data including multimedia data. The main AP 210 may include various processing circuitry, such as, for example, and without limitation, a dedicated processor, a CPU, or the like, and may be formed of a system-on-chip (SoC), for example. According to an embodiment of the present disclosure, the main AP 210 may further include a graphic processing unit (GPU). The GPU or image signal processor included in the main AP 210 may control normal screen display of the electronic device. In the case that the RGB camera is connected to the main AP 210, the GPU and/or the image signal processor included in the main AP 210 may be capable of processing the capture data received from the RGB camera.

The sub-application processor 215 may include various processing circuitry that generates 3D data requested by a predetermined application based on the raw data received from the camera module 291 and transmits the 3D data to the application via the main AP 210.

The communication module 220 (e.g., the communication interface 170) may perform a data communication with any other electronic device (e.g., the electronic device 104 or the server 106) connected to the electronic device 201 (e.g., the electronic device 101) through the network. According to an embodiment of the present disclosure, the communication module 220 may include various communication circuitry, such as, for example, and without limitation, a cellular module 221, a Wi-Fi module 223, a BT module 225, a GNSS module 227, an NFC module 228, and a radio frequency (RF) module 229.

The cellular module 221 may offer a voice call, a video call, a message service, an internet service, and the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM module 224. According to an embodiment of the present disclosure, the cellular module 221 may perform at least a part of functions that the main AP 210 can provide. For example, the cellular module 221 may perform at least part of a multimedia control function.

Each of the Wi-Fi module 223, the BT module 225, the GNSS module 227 and the NFC module 228 may include a processor for processing data transmitted or received therethrough. Although FIG. 2 shows the cellular module 221, the Wi-Fi module 223, the BT module 225, the GNSS module 227 and the NFC module 228 as different components, at least a part of these components may be contained in a single integrated circuit (IC) chip or a single IC package according to an embodiment of the present disclosure.

The RF module 229 may transmit and receive data, e.g., RF signals or any other electric signals. The RF module 229 may include a transceiver, a power amplifier module (PAM), a frequency filter, a low noise amplifier (LNA), and the like. Although FIG. 2 shows that the cellular module 221, the Wi-Fi module 223, the BT module 225, the GNSS module 227 and the NFC module 228 share the RF module 229, at least one of these components may perform transmission and reception of RF signals through a separate RF module according to an embodiment of the present disclosure.

The SIM module 224 may include, for example, an embedded SIM and/or a SIM card, and may include unique identification information (e.g., an integrated circuit card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random-access memory (RAM) (DRAM), a static RAM (SRAM), a synchronous dynamic RAM (SDRAM), etc.), and a non-volatile memory (e.g., a onetime programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a Not OR (NOR) flash memory, etc.). According to an embodiment of the present disclosure, the internal memory 232 may be in the form of a solid-state drive (SSD).

The external memory 234 may further include a flash drive, for example, a compact flash (CF), a secure digital (SD), a micro-secure digital (Micro-SD), a mini-secure digital (Mini-SD), an extreme digital (xD), a memory stick, and/or the like. The external memory 234 may be functionally connected to the electronic device 201 through various interface(s).

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 2406G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user.

The pen sensor 254 (e.g., a digital pen sensor), for example, may be implemented by using a method which may be identical or similar to a method of receiving a touch input from the user, or by using a separate sheet for recognition. For example, a key pad or a touch key may be used as the keys 256. The ultrasonic input unit 258 may enable the terminal to sense a sound wave by using a microphone 288 of the terminal through a pen generating an ultrasonic signal, and to identify data.

According to an embodiment of the present disclosure, the input device 250 may receive an input for designating one of the first band and the second band to be used for the function.

The display 260 (e.g., the display 150) may include a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include various interface circuitry, such as, for example, and without limitation, an HDMI 272, a USB 274, an optical interface 276, or a D-subminiature (D-sub) 278. The interface 270 may be contained, for example, in the communication interface 170 shown in FIG. 1. Additionally, or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present disclosure, the camera module 291 may include at least one image sensor (e.g., a front sensor or a rear sensor), a lens, an image signal processor (ISP), or a flash (e.g., a light emitting diode (LED) or xenon lamp).

The power management module 295 may manage electric power of the electronic device 201. The power management module 295 may include, for example, a power management integrated circuit (PMIC), a charger integrated circuit (IC), or a battery gauge. The PMIC may be mounted to, for example, an IC or a system on chip (SoC) semiconductor. Charging methods may be classified into a wired charging method and a wireless charging method. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of a part thereof (e.g., the main AP 210). The motor 298 may convert an electric signal into a mechanical vibration. The electronic device 201 may include a specific processor (e.g., a GPU) for supporting a mobile TV. This processor may process media data that comply with standards of digital multimedia broadcasting (DMB), digital video broadcasting (DVB), or media flow.

Each of the above-described elements of the electronic device disclosed herein may be formed of one or more components, and the name of each element may vary according to the type of the electronic device. The electronic device disclosed herein may be formed of at least one of the above-discussed elements without some elements or with additional other elements. Some of the elements may be integrated into a single entity that still performs the same functions as the respective functions of such elements before integrated.

Although FIG. 2 is directed to the case where the sub-processor 215 and the camera module 291 are included in the electronic device, the configuration of the electronic device is not limited thereto. For example, the sub-processor 215 and the camera module 291 may be integrated into an external camera device that is connected to the electronic device 201 through a wired or wireless link. The external camera device may include various sensors (a location sensor (e.g., GPS sensor), a gyro sensor, a geomagnetic sensor, and/or an acceleration sensor) for collecting location and posture information.

Figure 3:
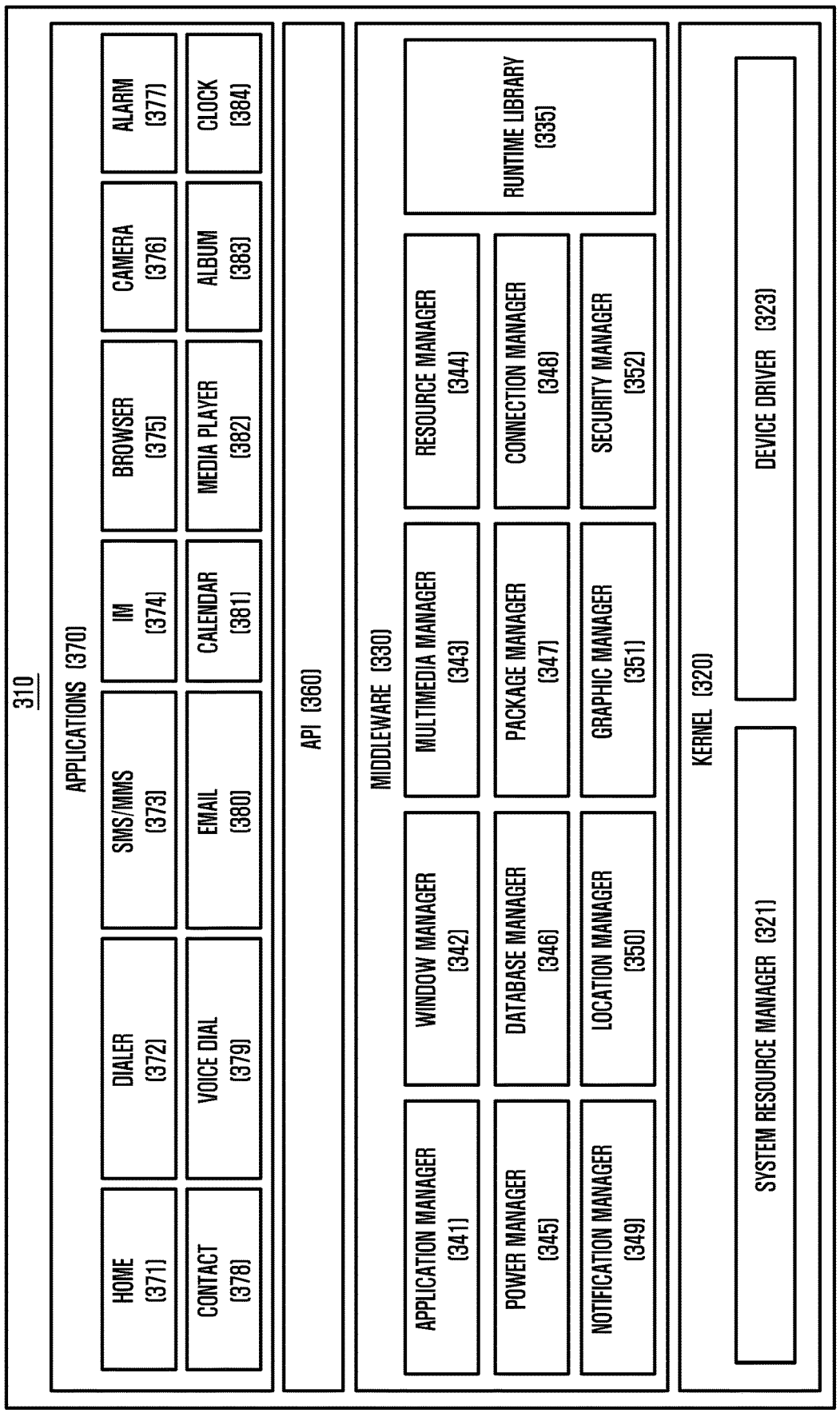
FIG. 3 is a block diagram illustrating a program module according to an embodiment.

FIG. 3 is a block diagram illustrating an example program module according to an example embodiment of the present disclosure.

Referring to FIG. 3, a program module 310 (e.g., the program 140) may include an operating system (OS) controlling resources related to the electronic device (e.g., the electronic device 101) and/or various applications (e.g., application 147) that are driven on the operating system. The operating system may include, for example, Android™, iOS™ Windows™, Symbian™, Tizen™, or Bada™.

The program module 310 may include, e.g., a kernel 320, middleware 330, an API 360, and/or an application 370. At least a part of the program module 310 may be preloaded on the electronic device or may be downloaded from any external electronic device (e.g., the electronic device 104 of the server 106).

The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly implemented by applications 370. The middleware 330 which may be, for example, similar to middleware 143. and may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats utilized to play various media files and use a codec appropriate for a format to perform encoding or decoding on media files. The resource manager 344 may manage resources, such as source code of at least one of the applications 370, memory and/or storage space.

The power manager 345 may operate together with a basic input/output system (BIOS), for example, to manage battery or power and provide power information utilized for operating the electronic device. The database manager 346 may generate, search, and/or query a database to be used in at least one of the applications 370. The package manager 347 may manage installation and/or updating of an application that is distributed in the form of a package file.

The connectivity manager 348 may manage wireless connectivity, such as, e.g., Wi-Fi or BT. The notification manager 349 may display or notify an event, such as a coming message, appointment, and/or proximity notification without interfering with the user. The location manager 350 may manage locational information on the electronic device. The graphic manager 351 may manage graphic effects to be offered to the user and their related user interface. The security manager 352 may provide various security functions utilized for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of the operating system to provide a differentiated function. Further, the middleware 330 may dynamically omit some existing components or add new components.

The API 360 (e.g., the API 145) may be a set of API programming functions, for example, and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, a clock 384, and/or a health-care application (e.g., measuring the degree of workout or blood sugar) (not shown), and/or environmental information (e.g., provision of air pressure, moisture, or temperature information) (not shown). The application 370 may include information exchanging application supporting information exchange between the electronic device (e.g., the electronic device 101) and an external electronic device (e.g., the electronic devices 102 and 104).

Examples of the information exchange application may include, but is not limited to, a notification relay application for transferring specific information to the external electronic device, and/or a device management application for managing the external electronic device. For example, a notification relay application may include a function for relaying notification information generated from other applications of the electronic device (e.g., the SMS/MMS application, the email application, the health-care application, or the environmental information application) to the external electronic device (e.g., the electronic devices 102 and 104).

Further, the notification relay application may receive notification information from, e.g., the external electronic device and may provide the received notification information to the user. A device management application may perform at least some functions of the external electronic device (e.g., the electronic device 102 or 104) such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device (e.g., the electronic devices 102 and 104). The application 370 may include an application received from the external electronic device (e.g., the server 106 or electronic devices 102 and 104). The application 370 may include a preloaded application or a third-party application downloadable from a server. The names of the components of the program module 310 according to the shown embodiment may be varied depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, or the like for performing one or more functions.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Figure 4:
FIG. 4 shows a front view of an electronic device according to an embodiment.

FIG. 4 shows a front view of an electronic device 401 according to various embodiments. Namely, FIG. 4 shows the front surface of the electronic device 401.

As shown in FIG. 4, the electronic device 401 may include a display 410, which may be a touch screen display, a housing 420, an optical sensor 430, a receiver 440, a camera 450, and a home button 460 (or a fingerprint sensor) which is one of combined buttons. The combined buttons may include 'a recent apps button (or key)' 461 and 'a back button (or key)' 462 as well as the home button 460. In addition, the combined buttons may further include a power button (764 in FIG. 18) and/or a volume button (not shown). Although the home button is described as an example of the combined button in this embodiment, the combined button is not limited to the home button.

The combined button 460 may be implemented as a combination of a physical button 460*a* and a virtual button 460*b*. The physical button 460*a* is located near the display 410 (namely, located on the housing 420), and the virtual button 460*b* is functionally extended from the physical button 460*a* and displayed on the display 410. The virtual button 460*b* may include a soft or virtual button (or key).

The physical button 460*a* located on the housing 420 may include a mechanical button. The virtual button 460*b* displayed on the display 410 may include a graphical user interface (GUI) that may be displayed on the display 410.

Each of the recent apps button (or key) 461 and the back button (or key) 462 may be located near a left or right side of the home button 460.

According to one embodiment, the display 410 may be formed on the entire front surface of the electronic device 401. In this case, the housing 420 may not be formed on the front surface of the electronic device 401.

According to another embodiment, the display 410 may be extended to a lateral surface of the electronic device 401. According to still another embodiment, the display 410 may be formed on only a part of the front surface of the electronic device 401. In this case, the housing 420 may be formed on the remaining part of the front surface of the electronic device 401.

Figure 6A:
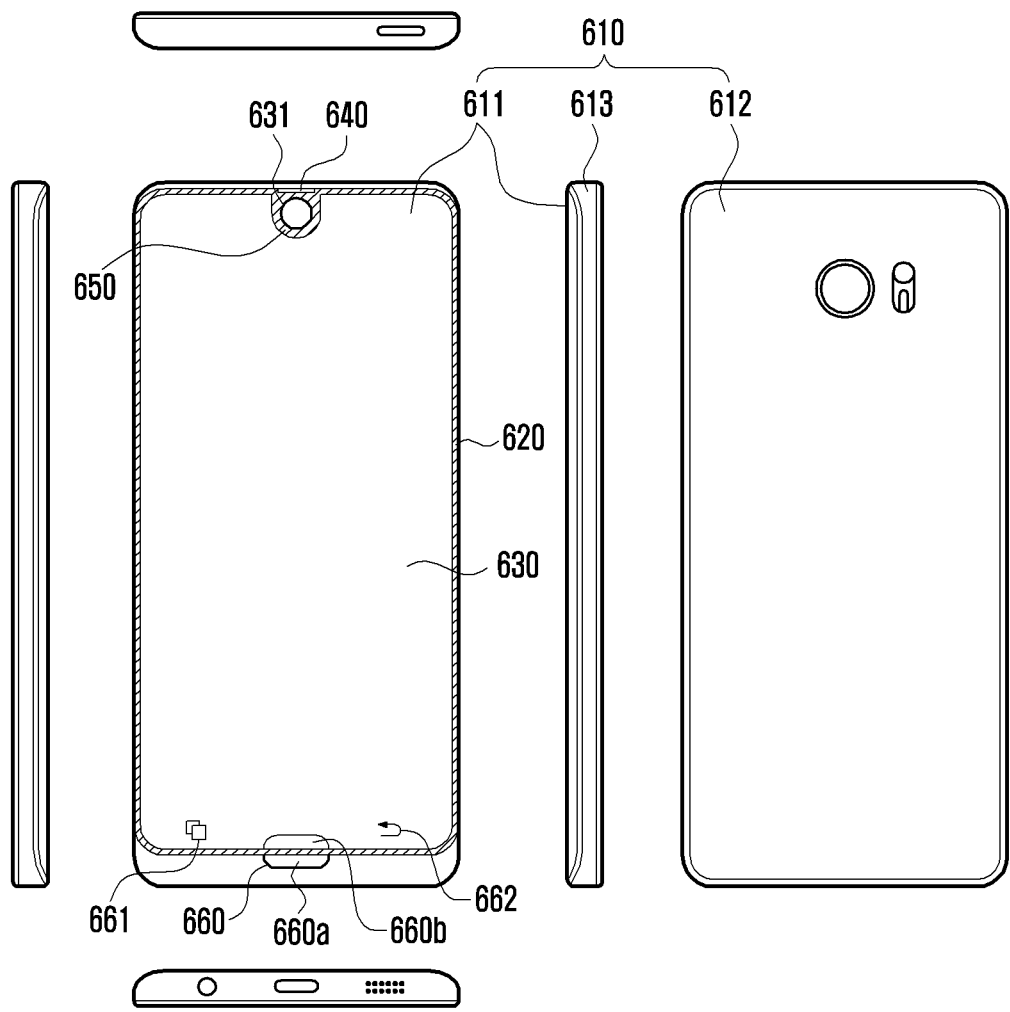
FIG. 6A shows six views (i.e., a plane view, a bottom view, a front view, a back view, a right-side view, and a left-side view) of an electronic device according to an embodiment.
Figure 6B:
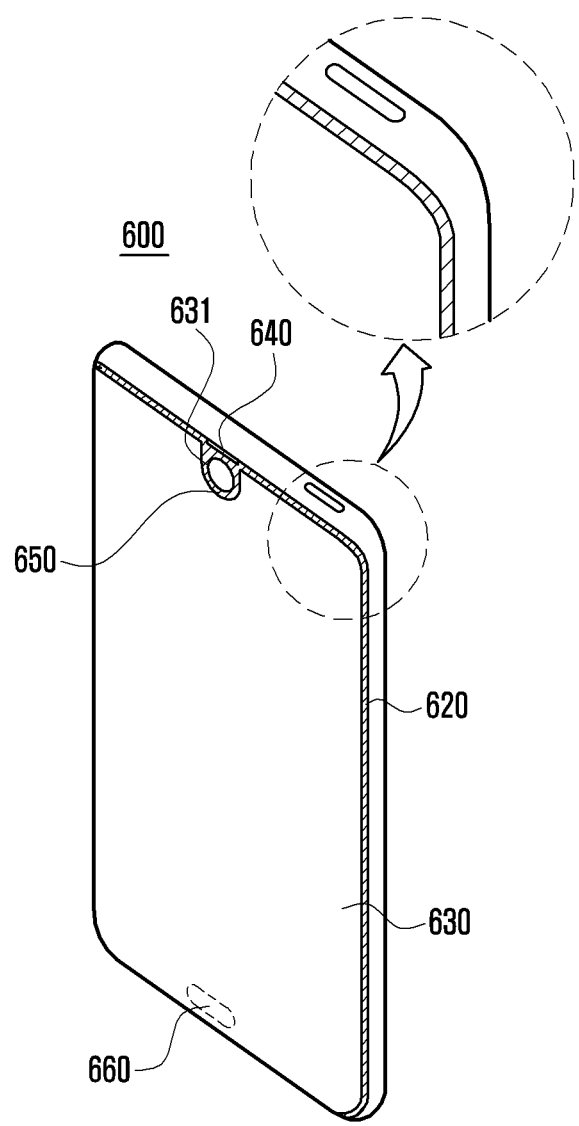
FIG. 6B shows a perspective view of an electronic device according to an embodiment.

The display 410 may be protected by a cover glass (620 in FIGS. 6A and 6B). According to one embodiment, the cover glass 620 may have a plurality of holes (or openings). For example, the cover glass 620 may include an optical sensor hole (not shown), a receiver hole (not shown), a camera hole (not shown), and a fingerprint sensor hole (or a home button hole, not shown). Also, the cover glass 620 may further include a cutout (631 in FIGS. 6A and 6B).

According to various embodiments, the optical sensor 430, the receiver 440, and the camera 450 may be disposed at an upper portion of the electronic device 401, and the home button 460 (or the fingerprint sensor) may be disposed at a lower portion of the electronic device 401. According to various embodiments, the optical sensor 430, the receiver 440, the camera 450, and/or the home button 460 (or the fingerprint sensor) may be totally or partially disposed at the outside or inside of the display 410. The optical sensor 430 may include, for example, a proximity sensor, an illumination sensor, an iris sensor, or a ultraviolet (UV) sensor.

According to another embodiment, the positions of the optical sensor 430, the receiver 440, the camera 450 and the home button 460 (or the fingerprint sensor) are not limited to those shown in FIG. 4. For example, the optical sensor 430 may be disposed at a lower portion of the electronic device 401.

Figure 5:
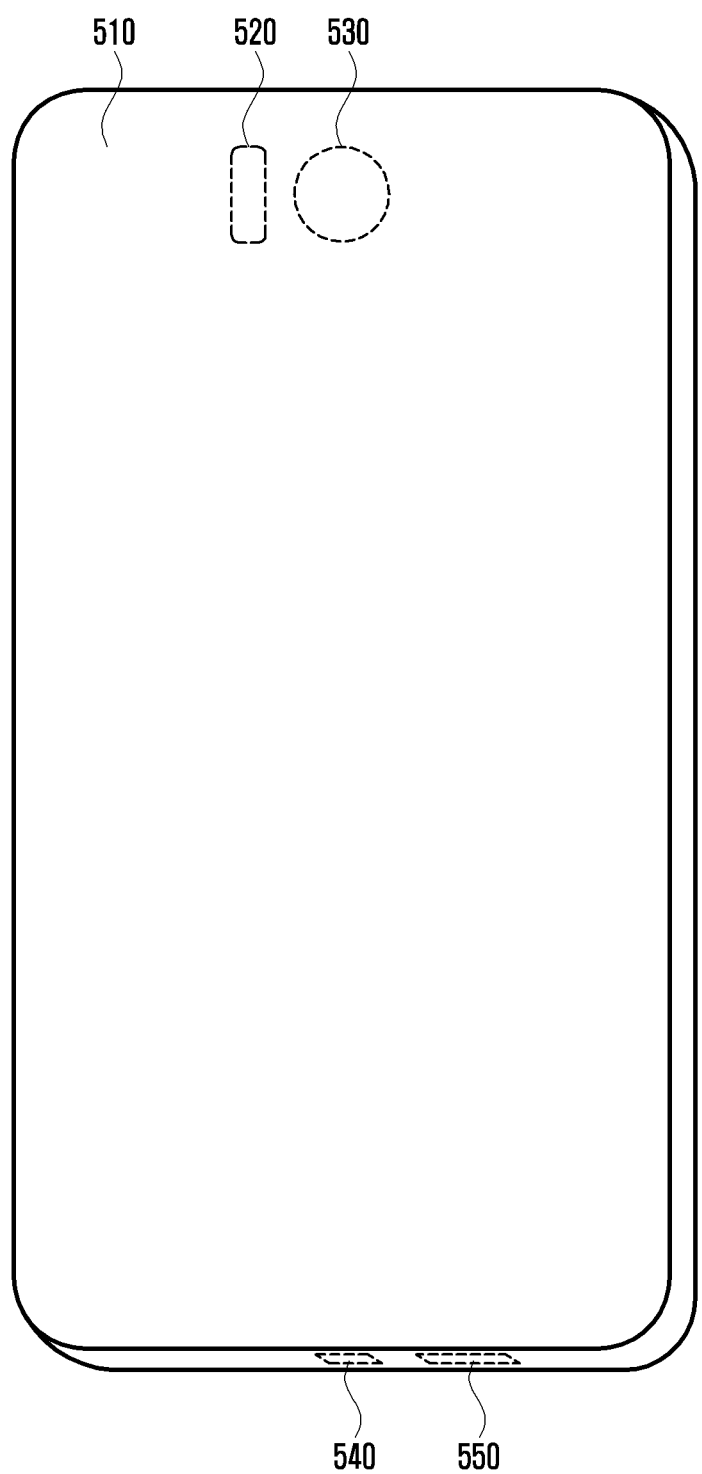
FIG. 5 shows a back view of an electronic device according to an embodiment.

FIG. 5 shows a back view of an electronic device 501 according to various embodiments.

Referring to FIG. 5, the back surface and the lateral surface of the electronic device 501 are shown. According to various embodiments, the electronic device 501 may include a housing 510, a biometric sensor 520, a camera 530, an interface 540, and a speaker 550.

According to one embodiment, the housing 510 may form the back and lateral surfaces of the electronic device 501. According to one embodiment, the biometric sensor 520 and the camera 530 may be disposed on the back surface of the electronic device 501, and the interface 540 and the speaker 550 may be disposed on the lateral surface of the electronic device 501. According to another embodiment, the positions of the biometric sensor 520, the camera 530, the interface 540 and the speaker 550 are not limited to those shown in FIG. 5.

FIG. 6A shows six views (i.e., a plane view, a bottom view, a front view, a back view, a right-side view, and a left-side view) of an electronic device 600 according to an embodiment and FIG. 6B shows a perspective view of an electronic device 600 according to an embodiment.

As shown in FIGS. 6A and 6B, the electronic device 600 may include a housing 610, a cover glass 620, a display panel 630, a camera module 640, a receiver hole 650, and/or a home button 660.

The housing 610 includes a first surface 611 (i.e., the front surface) facing the first direction, a second surface 612 (i.e., the back surface) facing the second direction opposite to the first direction, and a lateral surface 613 surrounding a space between the first and second surfaces 611 and 612.

The cover glass 620 may protect components, such as the display panel 630, of the electronic device 600. The cover glass 620 may correspond to at least the front surface of the electronic device 600. For example, the cover glass 620 may occupy the entire front surface. Alternatively, the cover glass 620 may occupy the entire front surface and a part of the lateral surface. Therefore, the cover glass 620 may be formed of a flat surface, or may further have a curved surface at upper, lower, left and/or right edges thereof. The cover glass 620 may be formed of a transparent material. For example, the cover glass 120 may be formed of a material such as reinforced glass, plastic (e.g., PET), and/or aluminum oxide, for example but is not limited thereto.

The display panel 630 may be disposed under the cover glass 620. The display panel 630 may be disposed inside the housing 610 while having curved edges at upper, lower, left and/or right ends thereof.

The display panel 630 may be a full front display that occupies most of the front surface of the electronic device. Because of extension of the display panel 630, the arrangement of other components may be changed. For example, components such as the camera module 640 and a receiver (not shown) may be disposed at the outermost position of the electronic device 600.

The display panel 630 may include an active area (not shown) and an inactive area (not shown). The active area may be exposed through a transparent area of the cover glass 620. The active area may output light according to an electrical signal supplied through a scan line and a data line. The aspect ratio of the active area may be, for example, 18.5:9 (or 19:9). In addition, the aspect ratio of the active area may include 4:3, 3:2, 8:5, 16:9, 16:10, 5:3, or 21:9, but is not limited thereto.

According to one embodiment, the active area may occupy, at least in part, the front surface and the lateral surface. For example, the active area may be disposed in a form of surrounding the front surface and the lateral surface. In the electronic device 600 according to one embodiment, the active area may be closer to the lateral surface than a typical active area.

A lateral portion of the active area may perform the function of a soft key capable of adjusting a sound volume. The position of the soft key may be changed, based on a user's grip state, a usage history, or the like. The active area may occupy most of the front surface (e.g., about 90% or more of the front surface).

The inactive area (not shown) may be a region that surrounds the active area. In the electronic device 600 according to one embodiment, the inactive area may be formed narrower than that of a typical electronic device. At least a portion of the inactive area may be exposed through the cover glass 620.

The inactive area may be, for example, a peripheral region of the display panel 630 which is obscured by an opaque masking layer. The opaque masking layer may be formed by printing a layer on the cover glass 620. The ratio of the width of the inactive area in the widthwise direction of the display panel 630 to the width of the inactive area in the lengthwise direction of the display panel 630 may be, for example, 1:1, 2:1, or 3:1. In another example, the inactive area may have a width ratio of 2:1:4, for example, at an upper portion, a lateral portion, and/or a lower portion of the display panel 630.

The display panel 630 may include one or more openings or one or more cutouts. For example, the display panel 630 may include at least one opening 631 formed at an upper portion of the active area. The display panel 630 may be disposed inside the housing 610 while being bent such that the opening 631 is positioned at the edge.

As shown in FIGS. 6A and 6B, on the front surface of the electronic device 600, the opening 631 may form a U-shaped space. Through this space of the opening 631, various modules of the electronic device 600 may be exposed.

Meanwhile, in this disclosure, a touch screen display may refer to a module including the display panel 630, a touch screen, the cover glass 620, a polarizing plate, and/or the like.

The camera module 640 may be disposed at a position corresponding to the opening or cutout. For example, the camera module 640 may be disposed in a space defined by one of the at least one opening or cutout. For example, the camera module 640 may be disposed in a space defined by the opening 631 formed at an upper portion of the active area. In addition, the camera module 640 may be exposed to the outside through the cover glass 620. For example, the camera module 640 may be disposed under the cover glass 620 while being visible externally through the cover glass 620. The camera module 640 may acquire an image by sensing light incident from the outside through the cover glass 620.

According to one embodiment, the camera module 640 may be disposed to be exposed through the center of an upper portion of the cover glass 620.

According to one embodiment, the camera module 640 may be disposed as close as possible to the outermost of the front surface.

The receiver hole 650 may be configured to transmit a sound, generated by the receiver disposed inside the housing 610, to the outside. The receiver hole 650 may be formed on the front surface 611 of the housing 610. For example, the receiver hole 650 may be formed in a metal frame on the lateral surface 613.

The front surface 611 of the housing 610 may be formed, together with the lateral surface 613, of a single metal frame having a certain curvature. The electronic device 600 may include a plurality of receiver holes 650. If the receiver hole 650 is formed on the lateral surface 613, a sound generated at the receiver may be transmitted to the outside without affecting the display panel 630 occupying the front surface 611 of the electronic device 100. Although FIG. 6A depicts the receiver hole 650 formed on the front surface 611 of the housing 610, this is exemplary only. Alternatively, the receiver hole 650 may be formed on the lateral surface 613 of the housing 610.

The home button 660, which is the combined button, may be disposed at a lower portion of the front surface of the electronic device 600. The home button 660, i.e., the combined button, may be a physical key (or button) or a soft key (or button). The home button 660, i.e., the combined button, may be formed of a physical button 660a in part and a soft or virtual button 660b in part.

When a part of the home button 660 which is the combined button is the physical button 660a, the display panel 630 may include an opening (not shown, similar to the opening 631 formed at an upper portion of the active area) or a cutout formed at a lower portion of the active area so as to dispose the part of the home button 660. Namely, the part of the home button 660 may be disposed in a space formed by the opening or cutout.

A part of the home button 660 which is the combined button may be formed of the soft button 660b at a lower portion of the front surface 611 of the electronic device 600. Namely, the home button 660 which operates as the combined button may be formed of a combination of the physical button 660a and the soft button 660b at a lower portion of the front surface 611 of the electronic device 600. When a part of the home button 660 is the soft button 660b, a fingerprint sensor may be disposed under the home button 660 in the display panel 630. In this case, the cover glass 620 may have a recess formed at a position where the fingerprint sensor is disposed. A recently app button 661 and a back button 662 may be located near a left or right side of the home button 660. These buttons 661 and 662 may also be the combined buttons. Further, a power button (not shown) located on the lateral surface of the electronic device 600 may also be the combined button.

As described above, the electronic device 600 according to one embodiment may include the display panel 630 exposed through the front surface 611 and the camera module 640 placed into the display panel 630.

Figure 18:
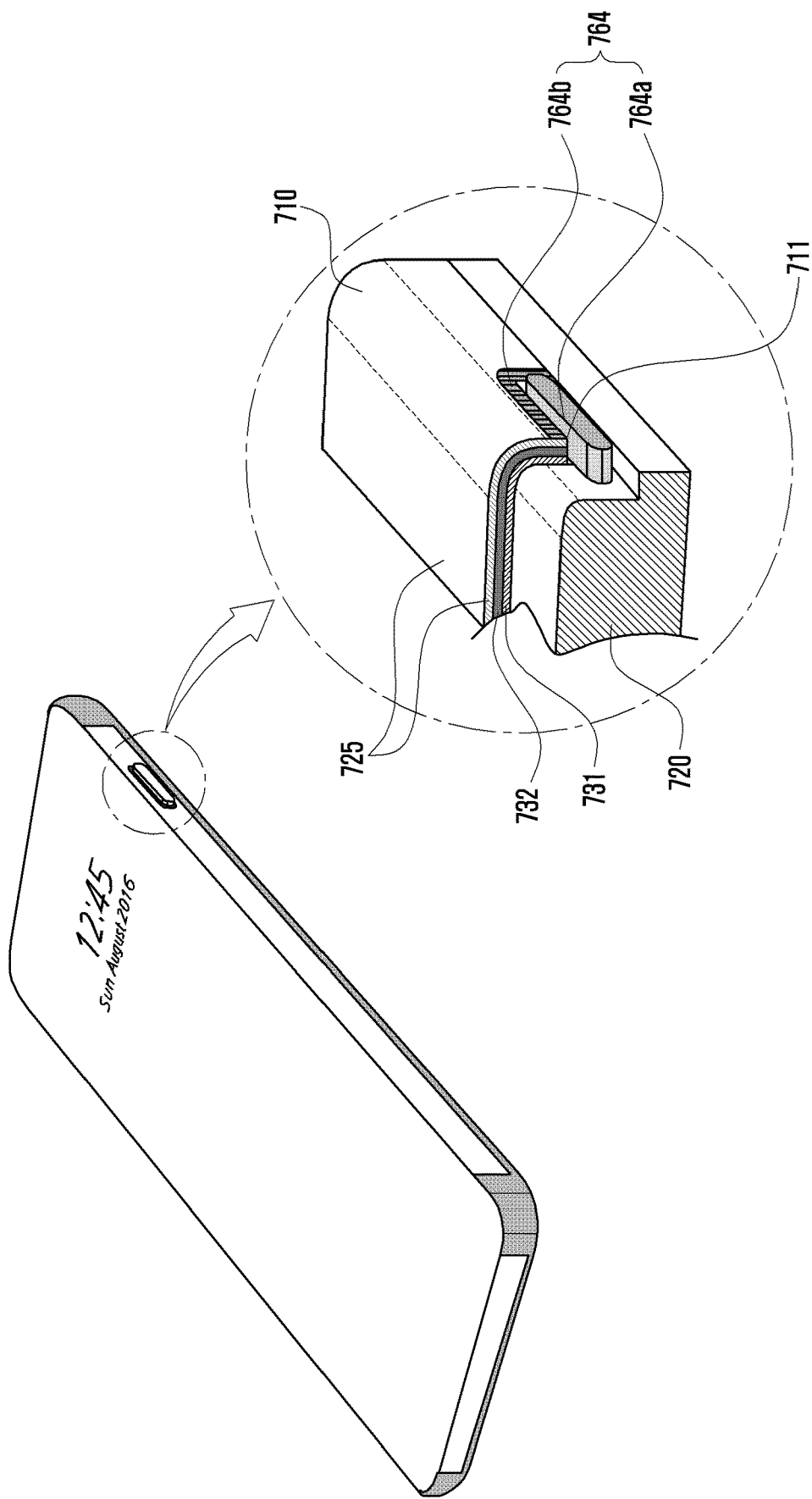
FIG. 18 shows a perspective view of an electronic device and a partially enlarged view of an area of the electronic device including a combined button of an electronic device according to one embodiment.

FIG. 7 is a diagram illustrating examples of a combined button of an electronic device according to one embodiment. FIG. 18 shows a perspective view of an electronic device and a partially enlarged view of an indicated area of the electronic device including a combined button of an electronic device according to one embodiment.

FIGS. 7 and 18 show examples of the combined button located on the front surface or the side surface of the electronic device 701. In FIGS. 7(a)-(d), the combined button is located on the front surface of the electronic device 701. In FIG. 18, the combined button is located on the lateral surface (or the back surface) of the electronic device 701. The combined button may be located on the front and lateral surfaces of the electronic device 701 together.

Any content (e.g., a wallpaper 411 in FIG. 4) may be displayed on a display 710 (e.g., a full front display) of the electronic device 701. The display 710 may include an edge display extended to one lateral surface (or both lateral surfaces). A housing 720 may be exposed out of the top and/or bottom of the display 710 on the front surface of the electronic device 701. Additionally or alternatively, the housing 720 may be exposed out of the left and/or right of the display 710 on the front surface of the electronic device 701. According to various embodiments, the housing 720 may not be exposed out of the left and/or right of the display 710 on the front surface of the electronic device 701.

In FIG. 7(a), the combined button located at a lower portion of the front surface of the electronic device 701 may be implemented as a function button corresponding to a home button 760, a recent app button 761, and a back button 762. In the electronic device 701 having only the home button 760, the combined button may be implemented as only the home button 760. In addition, the combined button located at a lower portion of the front surface of the electronic device 701 may be implemented as a power button (764 in FIG. 18) or a volume button (not shown).

The home button 760 which is the combined button may include a physical button 760a located on the housing 720 and a virtual button 760b located on the display 710. The home button 760 may have a circular shape, an oval shape, a rectangular shape, or a rounded rectangular shape. In the home button 760, the color of the physical button 760a may be different from the color of the virtual button 760b. The colors of the physical button 760a and the virtual button 760b may be different partly from each other.

Figure 8:
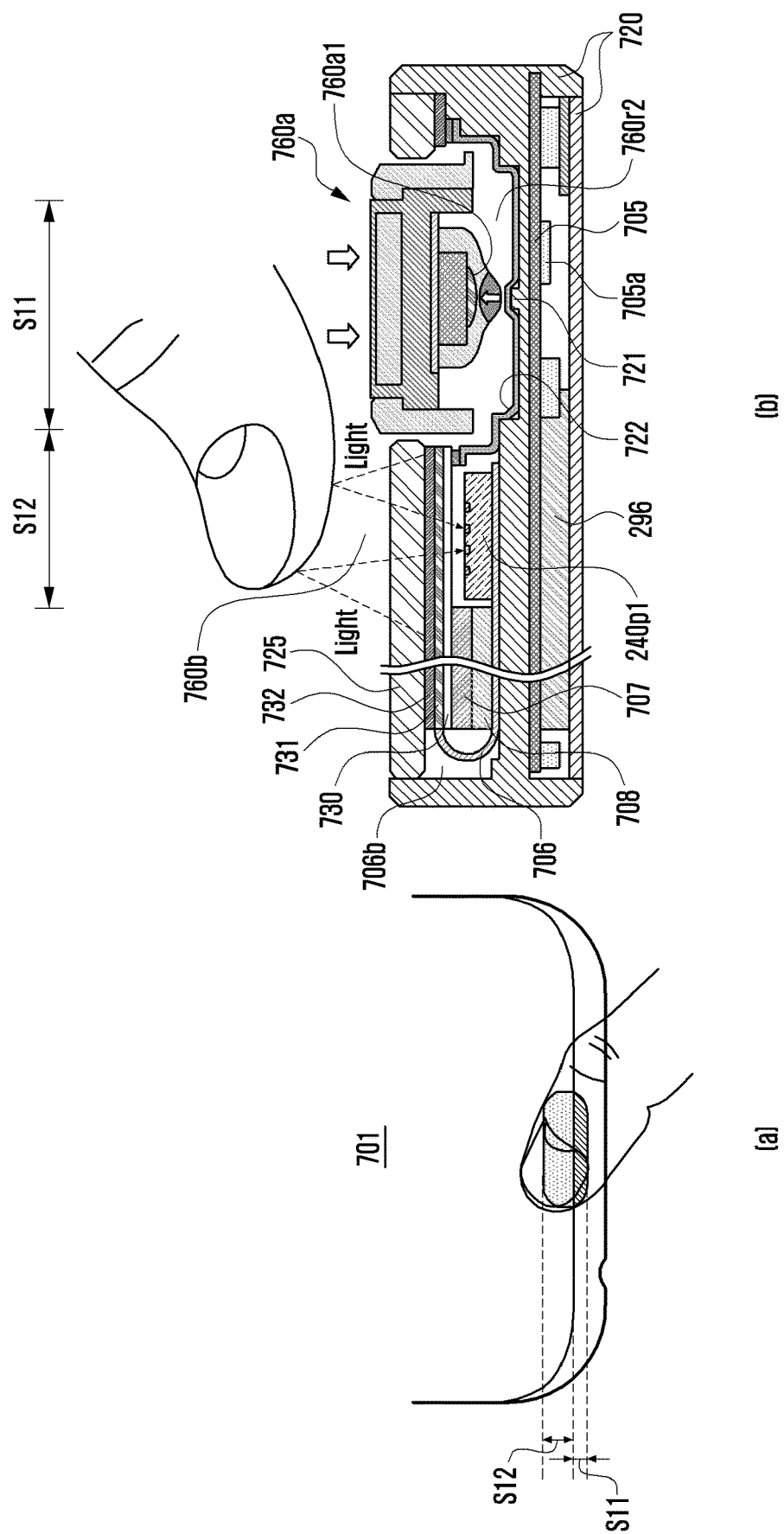
FIGS. 8(*a*)-(*b*) shows a front view and a cross-sectional view of a combined button of an electronic device according to one embodiment.

In an embodiment, the physical button may be embossed or engraved on a cover glass (725 in FIG. 8). The physical button may be formed by inserting a printing material and a ring structure into the cover glass 725. If the physical button is a non-dome button, there may be no separate slit between the physical button and the cover glass. It is sufficient that the physical button has an artificial and physical shape and can be recognized as a button (or key) by the user.

The recent app button 761 which is one of the combined buttons may include a physical button 761a and a virtual button 761b. Also, the back button 762 which is another combined button may include a physical button 762a and a virtual button 762b.

Under the virtual button 760b of the home button 760, a sensor (e.g., a fingerprint sensor) may be disposed. The fingerprint sensor may include an optical fingerprint sensor, a capacitive fingerprint sensor, or an ultrasonic fingerprint sensor.

In the combined button 760, 761 or 762, the area of the physical button 760a, 761a or 762a may be equal to or smaller than the area of the virtual button 760b, 761b or 762b. A detailed structure of the combined button will be described later.

In FIG. 7(b), the combined button located at a lower portion of the front surface of the electronic device 701 may be implemented as a home button 760-1. The display 710 (or a display panel) may include an opening 711 (or a cutout). In the opening 711, a part of the home button 760-1 which is the combined button may be positioned.

The home button 760-1 which is the combined button may include a circular shape, a circular band shape, an oval shape, or a rectangular shape.

Under a physical button 760a1 of the home button 760-1, a sensor (e.g., a fingerprint sensor) may be disposed. The fingerprint sensor may include an optical fingerprint sensor, a capacitive fingerprint sensor, or an ultrasonic fingerprint sensor.

Because of the opening 711, the area of the physical button 760a1 of the home button 760-1 may be greater than the area of a virtual button 760b1. A detailed structure of the combined button will be described hereinbelow.

In this case, the recent app button 761 and the back button 762 may be implemented as virtual buttons 761b1 and 762b1, respectively.

In FIG. 7(c), the combined button located at a lower portion of the front surface of the electronic device 701 may be implemented as a circular home button 760-2.

The circular home button 760-2 which is the combined button may include a physical button 760a2 located on the housing 720 and a virtual button 760b2 located on the display 710.

Under the physical button 760a2 of the home button 760-2, a sensor (e.g., a fingerprint sensor) may be disposed. The fingerprint sensor may include an optical fingerprint sensor, a capacitive fingerprint sensor, and/or an ultrasonic fingerprint sensor. Alternatively, the fingerprint sensor may be positioned under both the physical button 760a2 and the virtual button 760b2 of the home button 760-2.

In the home button 760-2, the area of the physical button 760a2 may be smaller than the area of the virtual button 760b2. A detailed structure of the combined button will be described later.

In FIG. 7(d), the combined button located at a lower portion of the front surface of the electronic device 701 may be implemented as a circular home button 760-3 in the display 710.

The circular home button 760-3 which is the combined button may include a physical button 760a3 located within the display 710 and a virtual button 760b3 surrounding the physical button 760a3 and located on the display 710. In order to expose the physical button 760a3, the glass 711 may have a physical button hole.

Under the physical button 760*a*3 of the home button 760-3, a sensor (e.g., a fingerprint sensor) may be disposed. The fingerprint sensor may include an optical fingerprint sensor, a capacitive fingerprint sensor, or an ultrasonic fingerprint sensor. The home button 760-3 which is the combined button disposed in the display 710 may include a circular shape, a circular band shape, an oval shape, or a rounded rectangular shape.

In the home button 760-3, the area of the physical button 760*a*3 may be smaller than the area of the virtual button 760*b*3. A detailed structure of the combined button will be described later.

In FIG. 18, the combined button located on the lateral surface of the electronic device 701 may be implemented as a power button 764 (or a power/hold button). The power button 764 which is the combined button may include a physical button 764*a* and a virtual button 764*b*. When the display 710 is extended toward the bottom of the lateral surface (e.g., closer to the back surface) of the electronic device, the physical button 764*a* may be located in the display 710, and the virtual button 764*b* may surround the physical button 764*a* and be located on the display 710. The power button 764 which is the combined button may include an oval shape or a rectangular shape.

Under the physical button 764*a* of the power button 764, a sensor (e.g., a fingerprint sensor) may be disposed. The fingerprint sensor may include an optical fingerprint sensor, a capacitive fingerprint sensor, or an ultrasonic fingerprint sensor.

FIG. 8 shows a front view and a cross-sectional view of a combined button of an electronic device according to one embodiment.

As shown in FIGS. 8(*a*)-(*b*), the home button 760 which is the combined button may receive a user input (such as a touch or a touch gesture). The user may input a fingerprint through the home button 760.

The home button 760 which is the combined button may be divided into a non-sensing area s11 and a sensing area s12. The electronic device 701 may acquire (or capture) a user fingerprint through the sensing area s12 of the home button 760.

The non-sensing area s11 may correspond to the physical button 760*a* of the home button 760. The sensing area s12 may correspond to the virtual button 760*b* of the home button 760. The sensing area s12 may refer to a specific area in which the fingerprint sensor (e.g., an optical fingerprint sensor 240*p*1) positioned under the virtual button 760*b* of the home button 760 can detect a user fingerprint contacted (or non-contacted) on a cover glass 725. There may be a gap between the physical button 760*a* and the virtual button 760*b*.

The area of the sensing area s12 corresponding to the virtual button 760*b* may be greater than the area of the non-sensing area s11 corresponding to the physical button 760*a*.

In a cross-sectional view that corresponds to FIG. 8(*b*), a battery 296 is located on the bottom of the housing 720. A printed circuit board (PCB) 705 is disposed between the bottom and intermediate of the housing 720 so as to mount a plurality of electronic elements 705*a*.

On the intermediate of the housing 720 in the sensing area s12, a flexible PCB 706 may be disposed. In the sensing area s12, the flexible PCB 706 may be electrically connected to a force touch panel 730, a display panel 731, a touch screen panel 732, and the fingerprint sensor 240*p*1. The force touch panel 730, the display panel 731, and the touch screen panel 732 may be collectively referred to as the display hereinafter.

The optical fingerprint sensor 240*p*1 may be disposed on a portion of the flexible PCB 706. Namely, when the fingerprint sensor is the optical fingerprint sensor 240*p*1, the optical fingerprint sensor 240*p*1 may be mounted on the flexible PCB 706 connected to the display 730, 731 and 732. A portion (e.g., a chip on panel (COP)) of the flexible PCB 706 that is connected to the display 730, 731 and 732 may be bent in a space 706*b* separated from the home button 760 so as to prevent interference with the home button 760.

A stack of a first protective layer 707 and a second protective layer 708 may be disposed on another portion of the flexible PCB 706, namely, located near the optical fingerprint sensor 240*p*1 on the flexible PCB 706. On the stack of the first and second protective layers 707 and 708, the display composed of the force touch panel 730, the display panel 731, and the touch screen panel 732 may be disposed. The force touch panel 730 may be formed of a transparent material for transmitting light in the sensing area s12. Alternatively, in case of being formed of an opaque material, the force touch panel 730 may have an opening for light transmission. On the touch screen panel 732, a cover glass 725 is placed.

The physical button 760*a* of the home button 760 corresponding to the non-sensing area s11 may be accommodated in a home button recess 760*r*2 formed near the optical fingerprint sensor 240*p*1. The physical button 760*a* may include a dome switch 760*a*1. The dome switch 760*a*1 of the physical button 760*a* may move downward by a user's click (or push or selection) and then come in contact with a tact point 721 located at the bottom of the home button recess 760*r*2. The physical button 760*a* and the optical fingerprint sensor 240*p*1 may be separated (or partitioned) from each other by a sealing rubber 722.

Figure 9:
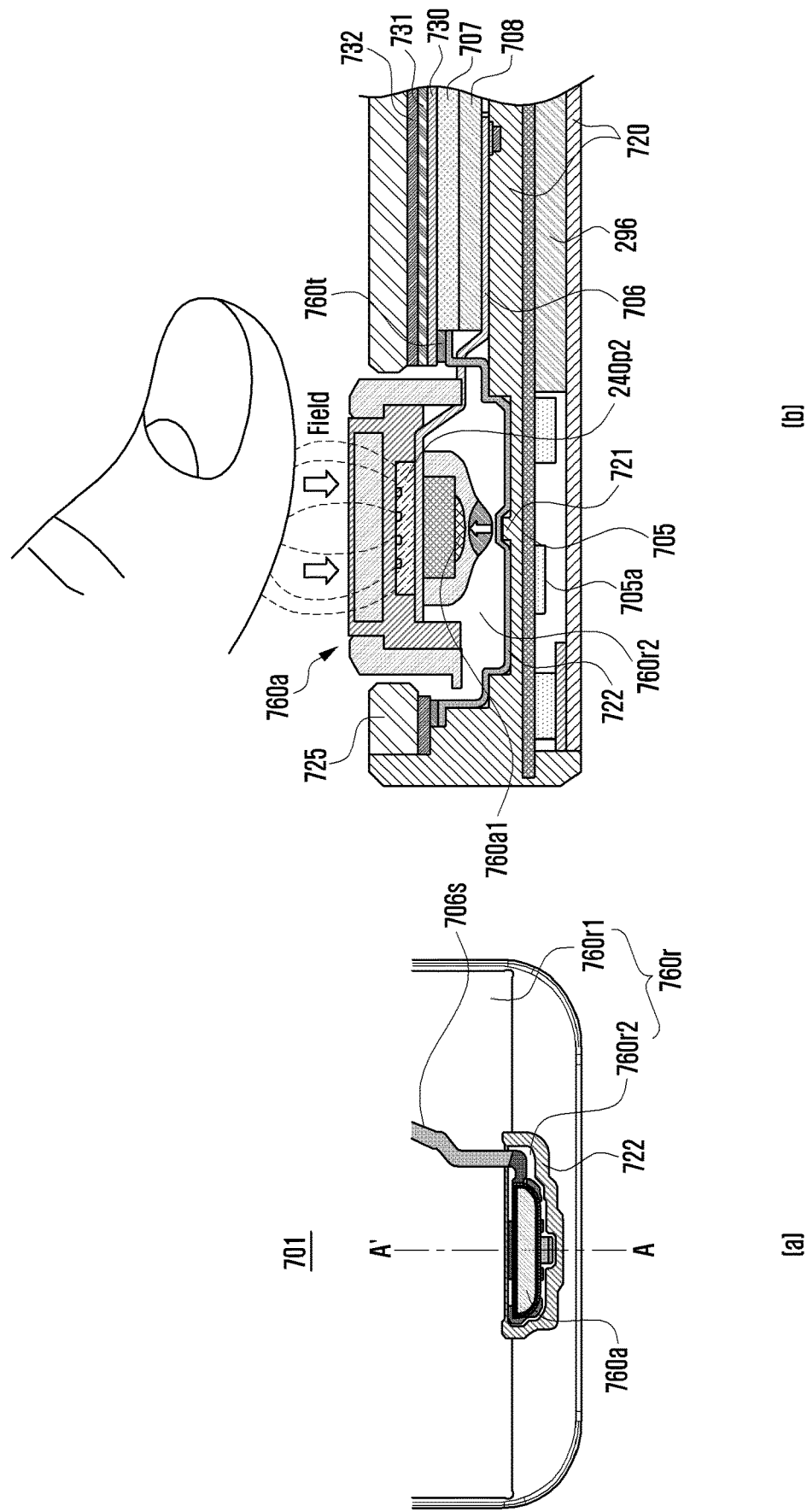
FIGS. 9(*a*)-(*b*) shows a front view and a cross-sectional view of a combined button of an electronic device according to another embodiment.

FIG. 9 shows a front view and a cross-sectional view of a combined button of an electronic device according to another embodiment.

When the display is increased in size or enlarged, the home button recess 760*r*2 may be integrated with a display recess 760*r*1 to form an integrated recess 760*r* as shown in FIG. 9. In the integrated recess 760*r*, the sealing rubber 722 separates the display recess 760*r*1 and the home button recess 760*r*2.

The sealing rubber 722 may have a sealing and waterproof function. The sealing rubber 722 may be adhered to the force touch panel 730 with an adhesive 760*t* (or an adhesive tape).

In a cross-sectional view that corresponds to part (b) of FIG. 9, the battery 296 is located on the bottom of the housing 720. The PCB 705 is disposed between the bottom and intermediate of the housing 720 so as to mount the plurality of electronic elements 705*a*.

On the PCB 705, a flexible PCB 706*s* may be disposed separately. The fingerprint sensor may be a capacitive fingerprint sensor 240*p*2 embedded in the physical button 760*a*. The flexible PCB 706*s* may be electrically connected to the capacitive fingerprint sensor 240*p*2.

The capacitive fingerprint sensor 240*p*2 may be mounted on the flexible PCB 706. When the fingerprint sensor is the capacitive fingerprint sensor 240*p*2, the capacitive fingerprint sensor 240*p*2 may be located inside the physical button 760*a* and mounted on the flexible PCB 706.

The user may input his or her fingerprint through the capacitive fingerprint sensor 240*p*2 of the home button 760.

The electronic device 701 may acquire (or capture) a user fingerprint through the capacitive fingerprint sensor 240p2 of the home button 760.

A stack of the first and second protective layers 707 and 708 may be disposed near the capacitive fingerprint sensor 240p2 on the flexible PCB 706. On the stack of the first and second protective layers 707 and 708, the display composed of the force touch panel 730, the display panel 731, and the touch screen panel 732 may be disposed. On the touch screen panel 732, the cover glass 725 may be placed.

The capacitive fingerprint sensor 240p2 embedded in the physical button 760a of the home button 760 may be surrounded by the sealing rubber 722 as shown in FIG. 9(a). The physical button 760a may include the dome switch 760a1. The dome switch 760a1 of the physical button 760a may move downward by a user's click (or selection) and then come in contact with the tact point 721 located at the bottom of the home button recess 760r2.

Figure 10:
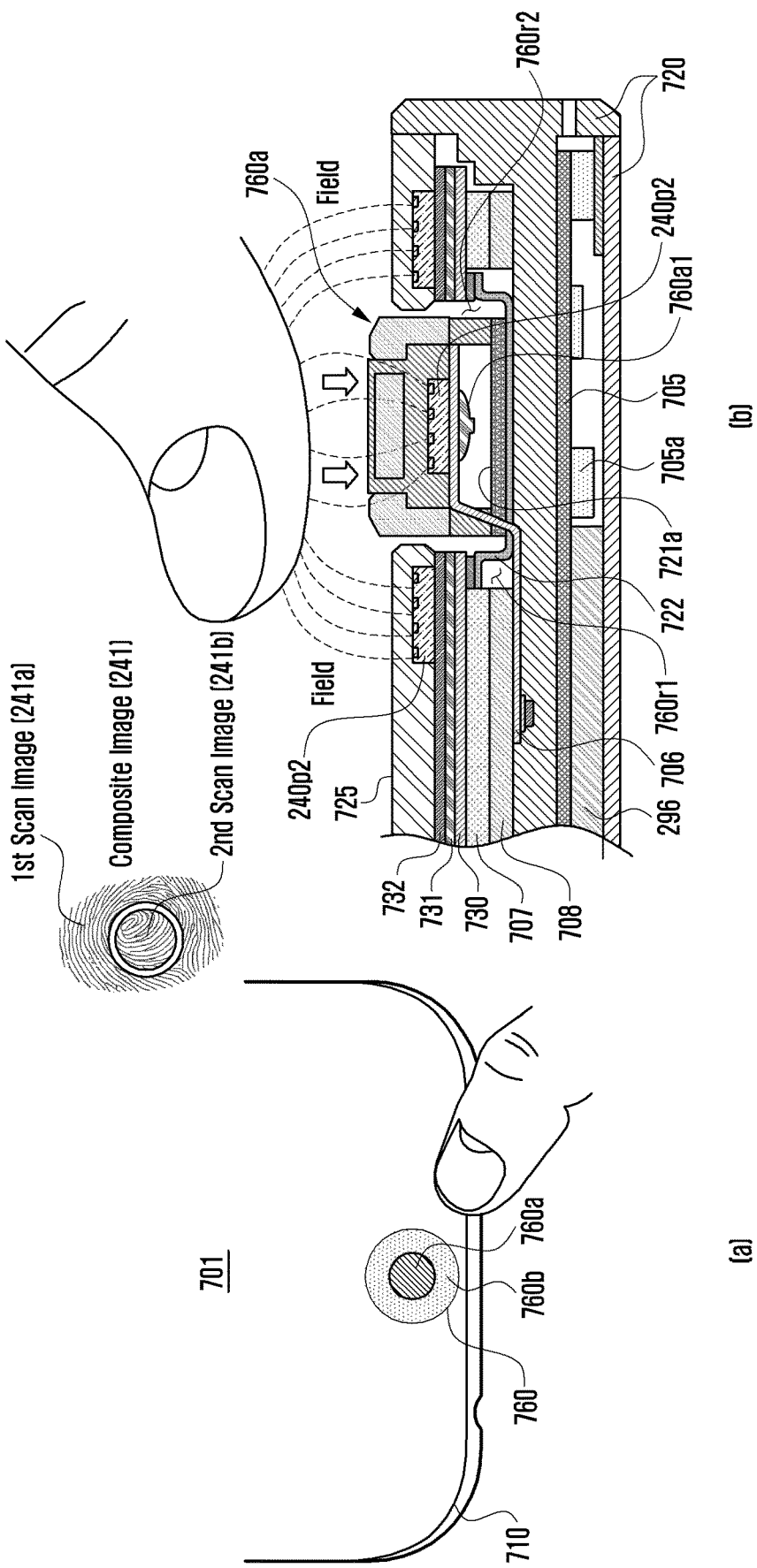
FIGS. 10(a)-(b) shows a front view and a cross-sectional view of a combined button of an electronic device according to still another embodiment.

FIGS. 10(a) and 10(b) show a front view and a cross-sectional view of a combined button of an electronic device according to still another embodiment.

Referring to FIG. 10(a), a circular home button 760 including a physical button 760a and a virtual button 760b may be implemented as an example of the combined button in the display 710.

Each of the physical button 760a and the virtual button 760b may include a fingerprint sensor. For example, the capacitive fingerprint sensor may be formed equally in each of the physical button 760a and the virtual button 760b.

The fingerprint sensor (e.g., the capacitive fingerprint sensor) corresponding to the virtual button 760b may be disposed (or mounted) to surround the fingerprint sensor (e.g., the capacitive fingerprint sensor) corresponding to the physical button 760a.

Alternatively, the physical button 760a and the virtual button 760b may include the same or different kinds of fingerprint sensors. For example, the physical button 760a may have the optical fingerprint sensor, and the virtual button 760b may have the capacitive fingerprint sensor or vice versa.

The fingerprint sensor (e.g., the optical fingerprint sensor) corresponding to the virtual button 760b may be disposed (or mounted) near (e.g., toward the receiver 440 of the electronic device 701) the fingerprint sensor (e.g., the capacitive fingerprint sensor) corresponding to the physical button 760a.

The first fingerprint sensor corresponding to the physical button 760a may be implemented as the capacitive fingerprint sensor 240p2. Alternatively, the first fingerprint sensor corresponding to the physical button 760a may be implemented as the optical fingerprint sensor 240p1 with an additional light source (not shown) or the ultrasonic fingerprint sensor. The second fingerprint sensor corresponding to the virtual button 760b may be implemented as the optical fingerprint sensor 240p1, the capacitive fingerprint sensor 240p2, or the ultrasonic fingerprint sensor.

The user may input his or her fingerprint through the first fingerprint sensor corresponding to the physical button 760a and the second fingerprint sensor corresponding to the virtual button 760b at a time (or together) in the home button 760.

The electronic device 701 may acquire (or capture) the user fingerprint through the first fingerprint sensor corresponding to the physical button 760a and the second fingerprint sensor corresponding to the virtual button 760b in the home button 760. The electronic device 701 may compose fingerprint images 241a and 241b respectively obtained by the first and second fingerprint sensors into a single fingerprint image 241.

In a cross-sectional view shown in FIG. 10(b), the battery 296 is located on the bottom of the housing 720. The PCB 705 is disposed between the bottom and intermediate of the housing 720 so as to mount the plurality of electronic elements 705a.

On the intermediate of the housing 720, the flexible PCB 706 may be disposed. The flexible PCB 706 may be electrically connected to the capacitive fingerprint sensor 240p2 embedded in the physical button 760a.

The capacitive fingerprint sensor 240p2 embedded in the physical button 760a may be disposed on the flexible PCB 706. Alternatively, the optical fingerprint sensor 240p1 may be disposed on the flexible PCB 706.

A stack of the first and second protective layers 707 and 708 may be disposed on the flexible PCB 706. On the stack of the first and second protective layers 707 and 708, the display composed of the force touch panel 730, the display panel 731, and the touch screen panel 732 may be disposed. The cover glass 725 may be placed on the touch screen panel 732. In addition to the capacitive fingerprint sensor 240p2 embedded in the physical button 760a, another capacitive fingerprint sensor 240p2 may be further disposed between the cover glass 725 and the touch screen panel 732.

The capacitive fingerprint sensor 240p2 embedded in the physical button 760a may be surrounded by the sealing rubber 722. The physical button 760a may include the dome switch 760a1. The dome switch 760a1 of the physical button 760a may move downward by a user's click (or selection) and then come in contact with a support fixture 721a located on the sealing rubber 722.

Similar to the previous embodiment as shown in FIG. 9, the display recess 760r1 and the home button recess 760r2 may be integrated with each other to form the integrated recess 760r. In the integrated recess 760r, the sealing rubber 722 separates the display recess 760r1 and the home button recess 760r2.

The sealing rubber 722 may be adhered to the force touch panel 730 with an adhesive (or an adhesive tape).

Figure 11:
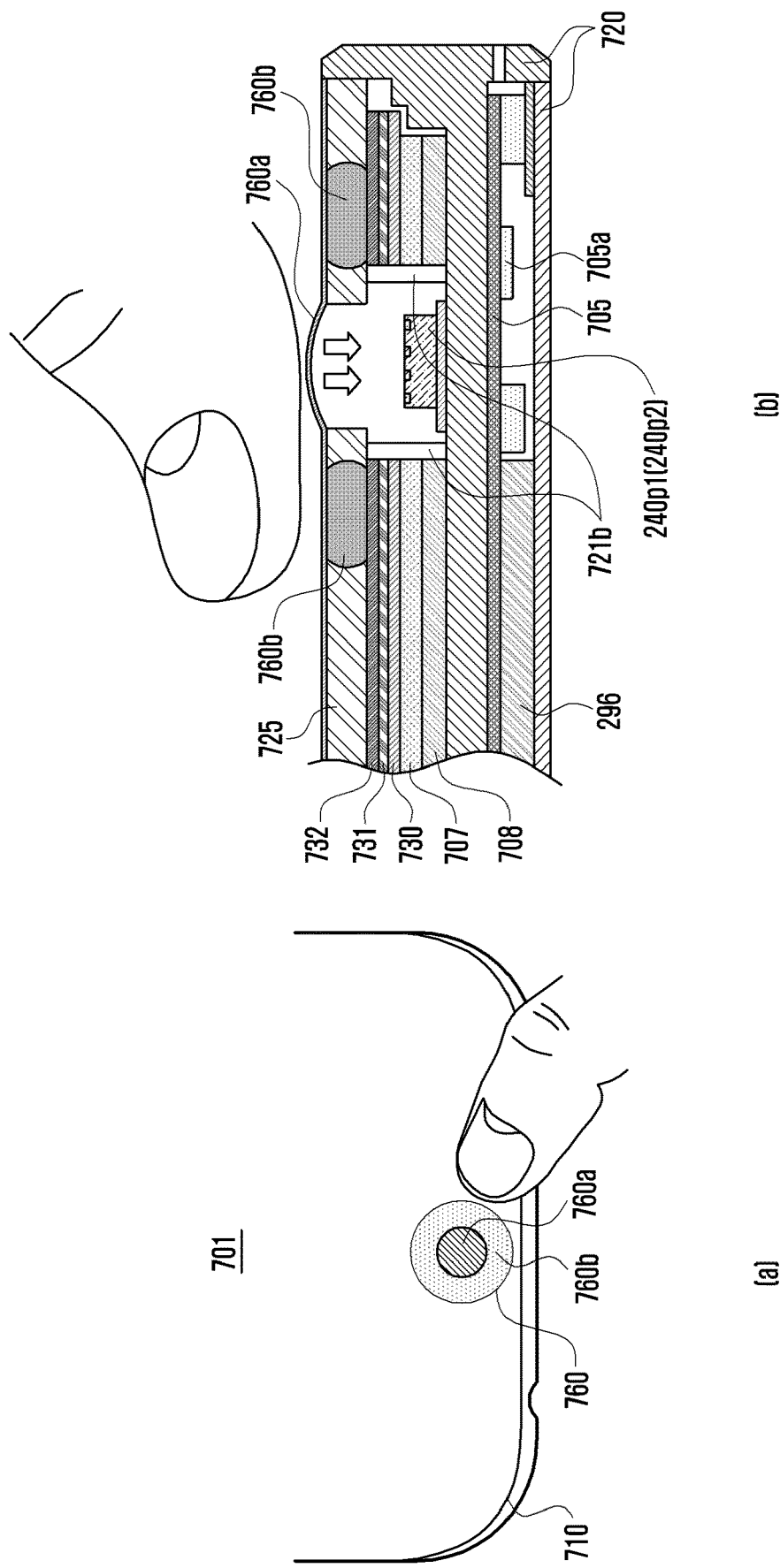
FIGS. 11(a)-(b) shows a front view and a cross-sectional view of a combined button of an electronic device according to yet another embodiment.

FIG. 11 shows a front view and a cross-sectional view of a combined button of an electronic device according to yet another embodiment.

Referring to FIG. 11, as another example of the combined button, the circular home button 760 including the physical button 760a and the virtual button 760b may be implemented on and in the cover glass 725 above the display 710.

In the circular home button 760 as shown in FIG. 11(b), the physical button 760a formed of a flexible film may be disposed on the surface of the cover glass 725, and the virtual button 760b may be disposed in the cover glass 725. The fingerprint sensor 240p1 (or 240p2 or the ultrasonic fingerprint sensor) may be placed inside the electronic device 701. Above the fingerprint sensor, only the physical button 760a formed on the cover glass 725 and supported by both supports 721b may be disposed.

Alternatively, in the circular home button 760 as shown in FIG. 11(a), the physical button 760a formed on the cover glass 760a may be surrounded by the virtual button 760b formed in the cover glass 725. The fingerprint sensor 240p1 or 240p2 may be placed inside the electronic device 701. Above the fingerprint sensor, the force touch panel 730, the display panel 731, the touch screen panel 732, the cover glass 725, and the physical buttons 760a, which are supported by the supports 721b, may be disposed.

In a cross-sectional view of FIG. 11(b), the battery 296 may be located on the bottom of the housing 720. The PCB 705 is disposed between the bottom and intermediate of the housing 720 so as to mount the plurality of electronic elements 705a.

On the PCB 705, the flexible PCB 706s may be disposed and connected to the fingerprint sensor 240p1 or 240p2 located under the physical button 760a. The supports 721b may be disposed near both sides of the fingerprint sensor 240p1 or 240p2 or surround the fingerprint sensor.

A stack of the first and second protective layers 707 and 708 may be disposed on the flexible PCB 706.

On the stack of the first and second protective layers 707 and 708, the display composed of the force touch panel 730, the display panel 731, and the touch screen panel 732 may be disposed. On the touch screen panel 732, the cover glass 725 may be placed. The virtual button 760b may be formed in the cover glass 725. The virtual button 760b may be disposed as if surrounding the physical button 760a formed on the cover glass 725.

Figure 12:
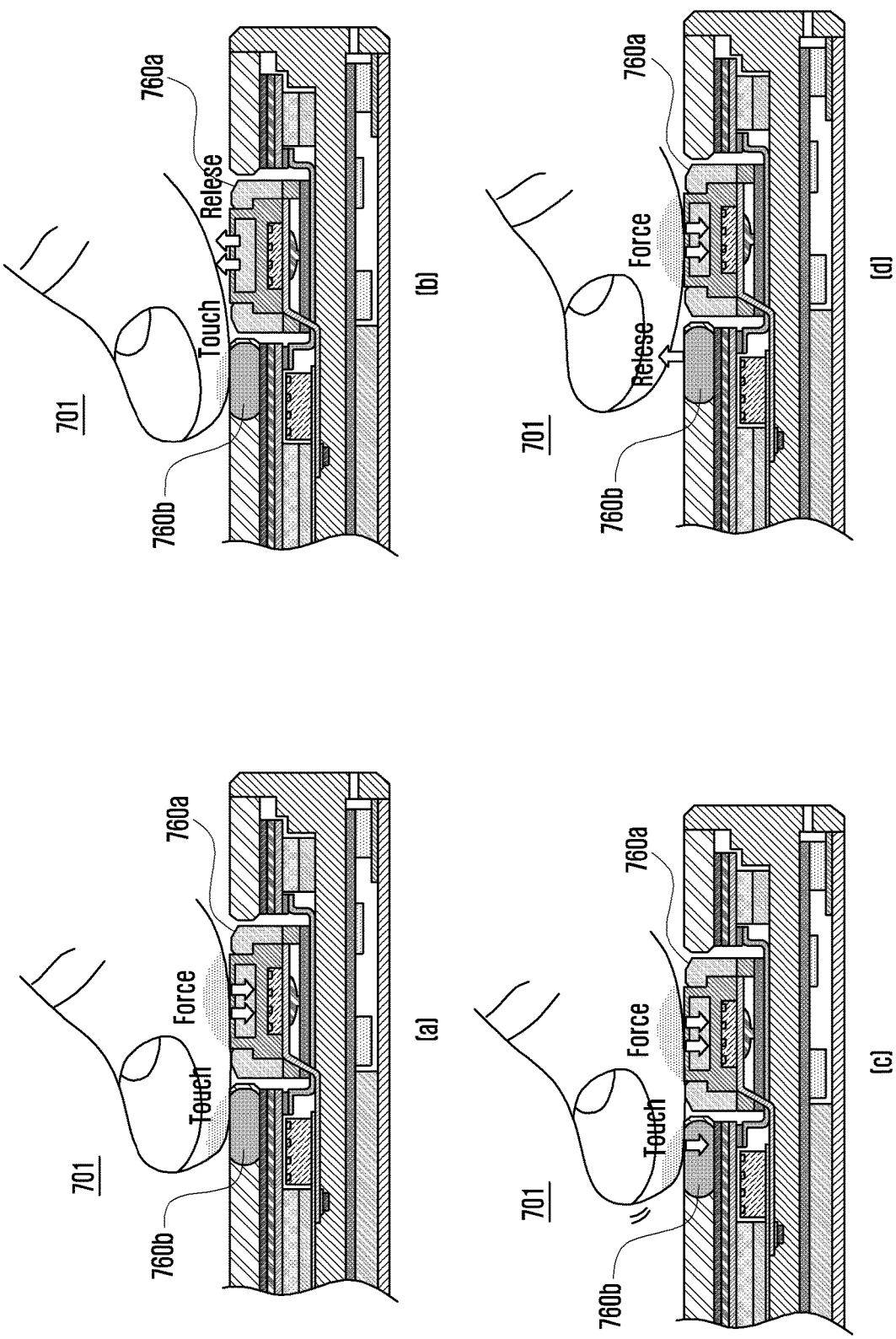
FIGS. 12(a)-(d) and 13(a)-(b) are diagrams illustrating an example of controlling a combined button of an electronic device according to one embodiment.
Figure 13:
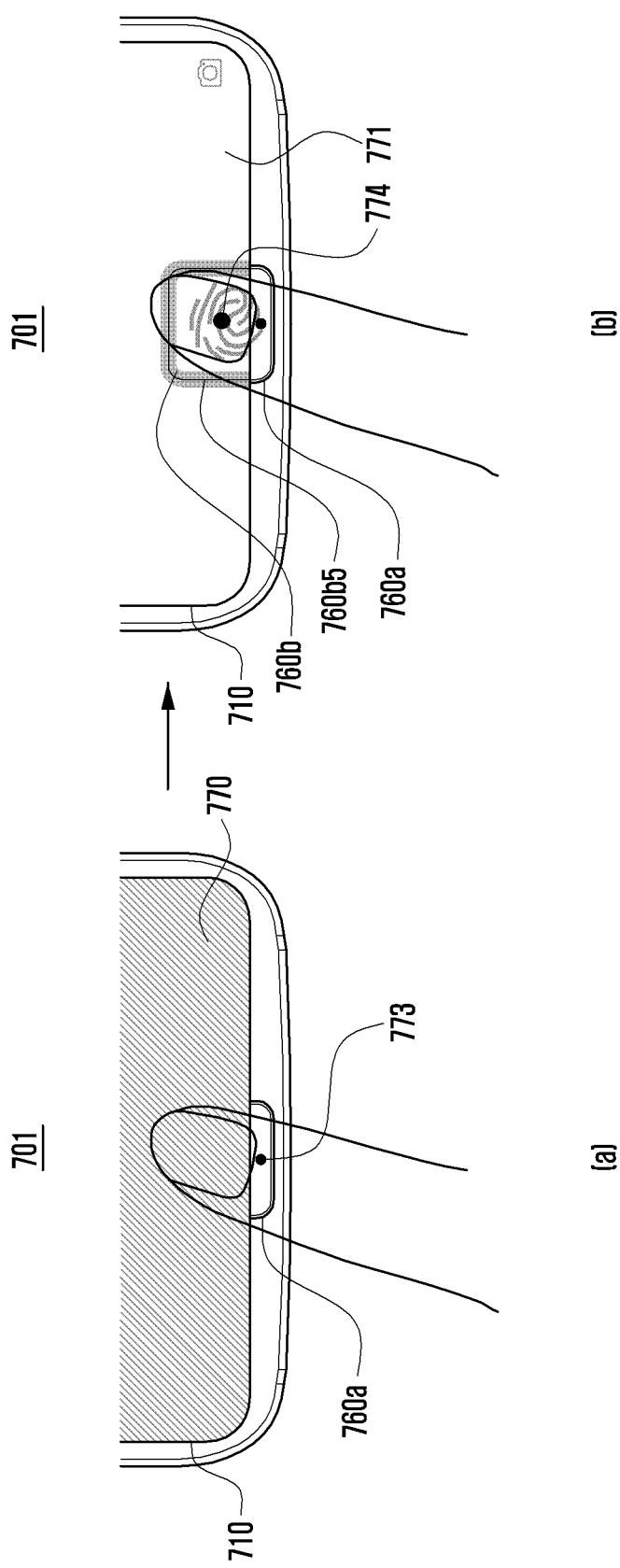

FIGS. 12 and 13 are diagrams illustrating an example of controlling a combined button of an electronic device according to one embodiment.

FIGS. 12 and 13 show an example of utilizing the home button 760 which is the combined button of the electronic device 701. The physical button 760a of the home button 760 may receive a first user input (e.g., a push, a touch, a selection, etc.). The virtual button 760b of the home button 760 may receive a second user input (e.g., a push, a touch, a touch gesture such as a swipe, etc.). Elements shown in cross-sectional views (a) to (d) of FIG. 12 are substantially similar to those of FIGS. 8 to 11, and thus repeated descriptions thereof will be omitted.

The first user input corresponding to the physical button 760a and the second user input corresponding to the virtual button 760b may be entered simultaneously (e.g., within a time difference of 100 ms between the first and second user inputs, which may be changeable) or sequentially (e.g., in the order of the first user input and the second user input).

As shown in FIG. 12(a), the user may perform the first user input (e.g., a push) for the physical button 760a and also perform the second user input (e.g., a touch) for the virtual button 760b. For example, the user may perform the first user input for the physical button 760a and the second user input for the virtual button 760b simultaneously (e.g., within a time difference of 100 ms between the first and second user inputs, which may be changeable) or sequentially (e.g., in the order of the first user input and the second user input, which may be changeable).

As shown in FIG. 12(a) and FIGS. 13(a)-(b), the electronic device 701 may perform a particular function (or operation) corresponding to the received first and second user inputs. For example, the electronic device 701, which is in a screen-off state 770 (or a sleep mode), may release the screen-off state 770 and then display a lock screen 771 in response to the received first user input 773.

When displaying the lock screen 771, the electronic device 701 may also display an edge 760b5 of the virtual button 760b. The electronic device 701 which is displaying the lock screen 771 may release the lock screen 771 in response to the second user input 774.

The above-discussed particular function (or operation) performed in response to the first and second user inputs is exemplary only, and the electronic device 701 may perform a variety of functions or operations depending on the combination of the received first and second user inputs.

As shown in FIG. 12(b), the user may perform the release of the first user input (e.g., a push) for the physical button 760a and also perform the second user input (e.g., a touch or a touch gesture such as a swipe) for the virtual button 760b. For example, the user may perform the first user input and the release thereof for the physical button 760a and the second user input for the virtual button 760b simultaneously (e.g., within a time difference of 100 ms among the first user input, the release of the first user input, and the second user input, which may be changeable) or sequentially (e.g., in the order of the first user input, the release of the first user input, and the second user input, which may be changeable).

The electronic device 701 may perform a particular function (or operation) corresponding to the received first user input, the release of the first user input, and the received second user input. For example, the electronic device 701 which is in the screen-off state may execute the first camera mode (e.g., selfie and beauty shot) using the front camera in response to the received first user input, the release of the first user input, and the received second user input (e.g., a swipe).

The above-discussed particular function (or operation) performed in response to the first user input, the release of the first user input, and the second user input is exemplary only, and the electronic device 701 may perform a variety of functions or operations depending on the combination of the received first user input, the release of the first user input, and the received second user input.

As shown in FIG. 12(c), the user may perform the first user input (e.g., a push) for the physical button 760a and also perform the second user input (e.g., a touch) for the virtual button 760b. For example, the user may perform the first user input for the physical button 760a and the second user input for the virtual button 760b simultaneously (e.g., within a time difference of 90 ms between the first and second user inputs, which may be changeable) or sequentially (e.g., in the order of the first user input and the second user input, which may be changeable).

The electronic device 701 may perform a particular function (or operation) corresponding to the received first and second user inputs. For example, the electronic device 701 which is executing the Samsung Pay application may perform user authentication in response to the received first and second user inputs. This function (or operation) performed in response to the first and second user inputs is exemplary only, and the electronic device 701 may perform a variety of functions or operations depending on the combination of the received first and second user inputs.

As shown in FIG. 12(d), the user may perform the first user input (e.g., a push) for the physical button 760a and also perform the release of the second user input (e.g., the release of a touch) for the virtual button 760b. For example, the user may perform the first user input for the physical button 760a and the release of the second user input for the virtual button 760b simultaneously (e.g., within a time difference of 100 ms among the first user input, the second user input, and the release of the second user input, which may be changeable) or sequentially (e.g., in the order of the first user input, the second user input, and the release of the second user input, which may be changeable).

The electronic device 701 may perform a particular function (or operation) corresponding to the received first, the received second user input, and the release of the second user input. This function (or operation) performed in response to the first user input, the second user input, and the release of the second user input is exemplary only, and the electronic device 701 may perform a variety of functions or operations depending on the combination of the first user input, the second user input, and the release of the second user input.

Figure 14:
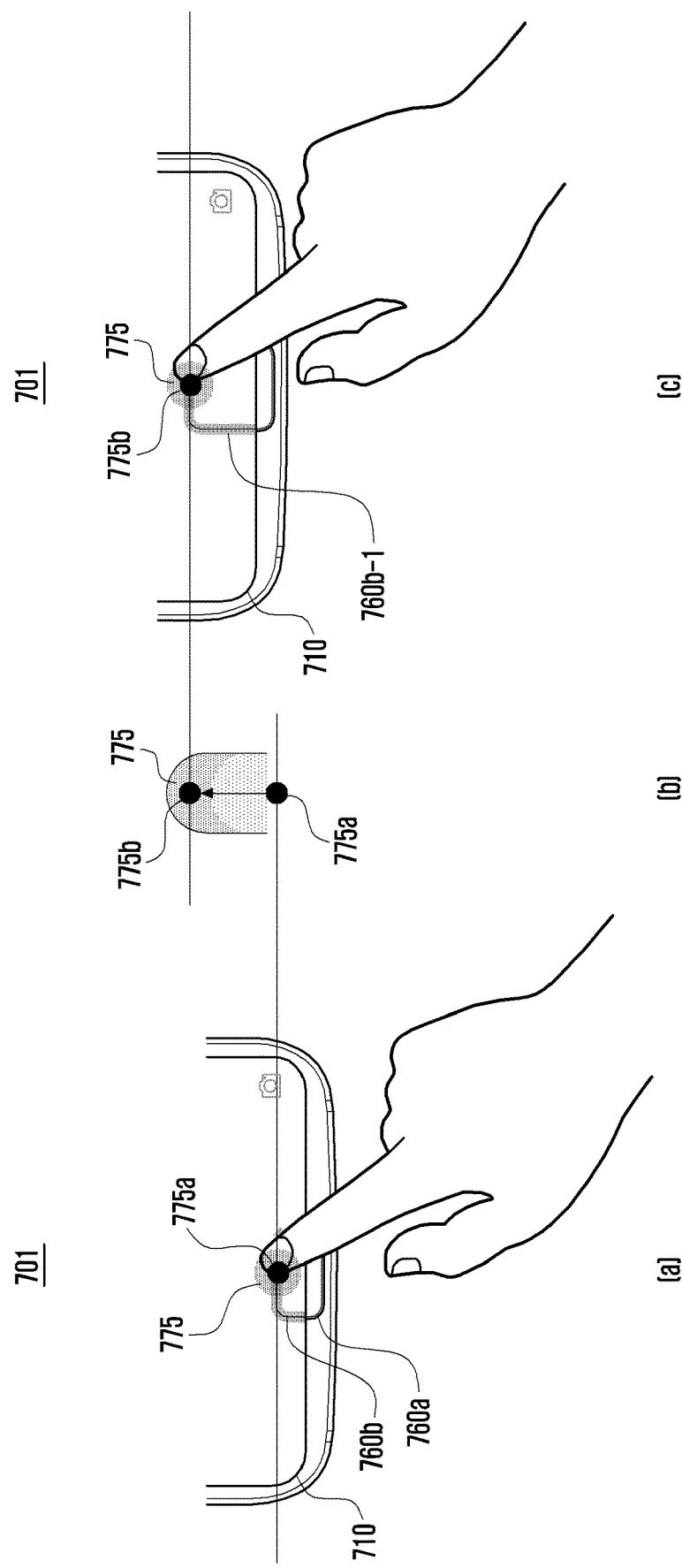
FIGS. 14(a)-(c) is a diagram illustrating an example of controlling a combined button of an electronic device according to another embodiment.

FIG. 14 is a diagram illustrating an example of controlling a combined button of an electronic device according to another embodiment.

As shown in FIG. 14 parts (a), (b) and (c), the user may change the size of the virtual button 760*b* in the home button 760, which is the combined button (that is, includes both a mechanical and a virtual button), by using a touch (or a touch gesture, etc.). In addition, using a touch (or a touch gesture, etc.), the user may change the shape (e.g., a triangular shape, a semicircular shape, a circular band shape, or a half-oval shape) of the virtual button 760*b* in the home button 760.

The user may perform a touch 775 on an edge 760*b*5 (or a corner) of the virtual button 760*b*. Then the electronic device 701 may detect the first touch position 775*a* of the edge 760*b*5 of the virtual button 760*b*. Also, the user may move the touch 775 (e.g., a touch gesture) from the first touch position 775*a* to the second touch position 775*b*. Then the electronic device 701 may detect the second touch position 775*b* of the edge 760*b*5 of the virtual button 760*b* being moved.

Additionally, the electronic device 701 may display a new virtual button 760*b*-1 changed in response to the movement of the touch. The area of the changed virtual button 760*b*-1 may be different from the area of the initial virtual button 760*b*.

The user may move the touch 775 in one direction (e.g., as shown in part (b) of FIG. 14), in two directions (e.g., starting at the first touch position 775*a* and moving from the second touch position 775*b* to the right 45 degrees), in three directions, or in four directions. In response to a moving distance and direction of the touch 775, the electronic device 701 may change the shape of the virtual button 760*b* (e.g., a triangular shape, a semicircular shape, a circular band shape, or a half-oval shape). For example, when the touch 775 moves in two directions, the shape of the virtual button 760*b* may be triangular.

Figure 15:
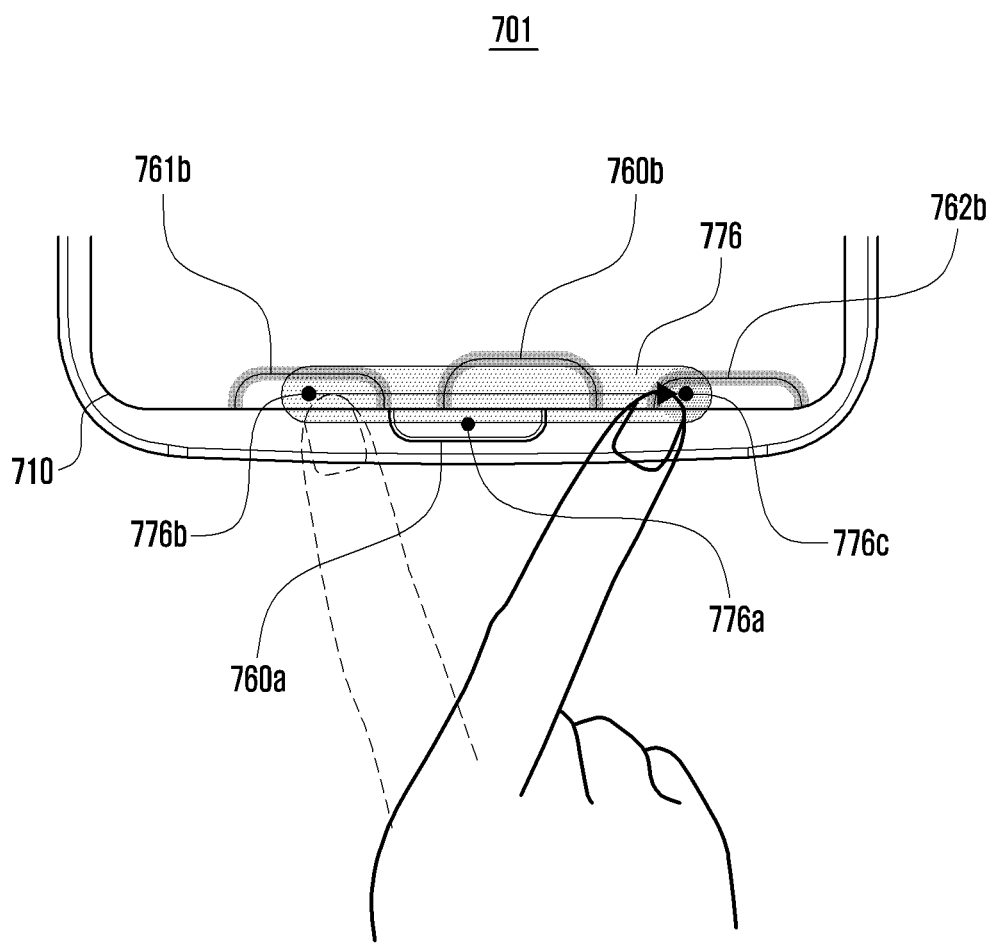
FIG. 15 is a diagram illustrating an example of controlling a combined button of an electronic device according to still another embodiment.

FIG. 15 is a diagram illustrating an example of controlling a combined button of an electronic device according to still another embodiment.

As shown in FIG. 15, the user may perform the first user input 776*a* (e.g., a double click or a long press) for the physical button 760*a*. Then the electronic device 701 may display virtual buttons 760*b*, 761*b* and 762*b* in response to the first user input.

The displayed virtual buttons 760*b*, 761*b* and 762*b* may contain icons (e.g., 760*b*6, 761*b*6 and 762*b*6 in FIG. 16) corresponding to their linked functions. The virtual button 760*b* may be displayed with a specific icon (e.g., a home button, not shown) corresponding to its particular function. Similarly, the virtual button 761*b* may be displayed with a specific icon (e.g., a microphone, not shown) corresponding to its particular function. Similarly, the virtual button 762*b* may be displayed with a specific icon (e.g., a camera, not shown) corresponding to its particular function.

The user may move the touch 776 along the displayed virtual buttons 760*b*, 761*b* and 762*b* (e.g., from the eleventh touch position 776*b* to the twelfth touch position 776*c*). In response to the movement of the touch 776, the electronic device 701 may change the positions of the virtual buttons 760*b*, 761*b* and 762*b*. For example, the electronic device 701 may sequentially change the positions of the virtual buttons 760*b*, 761*b* and 762*b* in accordance with the moving direction of the touch 776. When the virtual buttons 760*b*, 761*b* and 762*b* whose positions are changed are displayed, the functions of the physical buttons 760*a*, 761*a* and 762*a* corresponding to the virtual buttons 760*b*, 761*b* and 762*b* may also be changed (or mapped). When one (e.g., 761*a*) of the physical buttons 760*a*, 761*a* and 762*a* corresponding to the virtual buttons 760*b*, 761*b* and 762*b* having the changed positions is selected, the changed function of the selected physical button may be executed (or performed).

Figure 16:
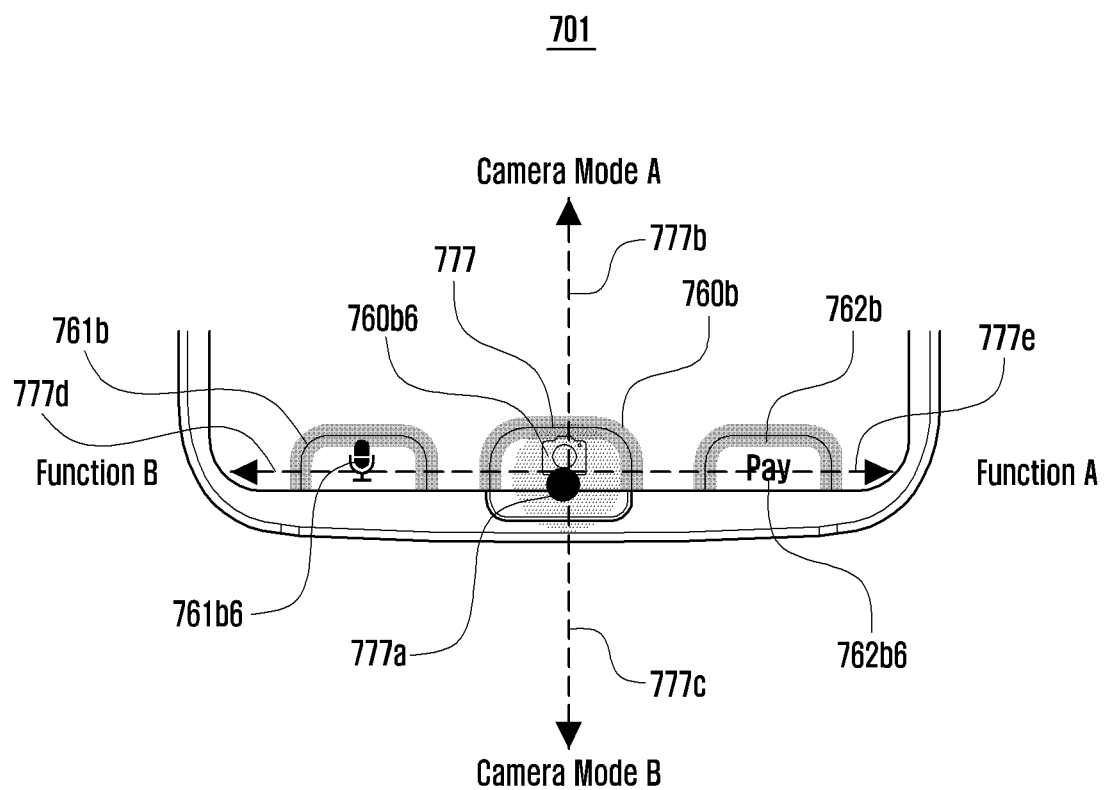
FIG. 16 is a diagram illustrating an example of controlling a combined button of an electronic device according to yet another embodiment.

FIG. 16 is a diagram illustrating an example of controlling a combined button of an electronic device according to yet another embodiment.

As shown in FIG. 16, the electronic device 701 may display respective icons 760*b*6, 761*b*6 and 762*b*6 corresponding to the functions of the displayed virtual buttons 760*b*, 761*b* and 762*b*. The user may perform the first user input (e.g., a touch gesture such as a swipe or a flick, which may be changeable) for the displayed virtual button 760*b*. For example, the first user input may be an input that moves in one direction (e.g., one of upward, downward, leftward and rightward directions).

The user may move a touch 777 from the displayed virtual button 760*b* (e.g., in one of upward, downward, leftward and rightward directions from the 21st touch position 777*a*). For example, when the touch 777 moves from the 21st touch position 777*a* in the upward direction 777*b*, the electronic device 701 may execute a camera mode A (e.g., selfie and beauty shot) in response to the movement of the touch 777. When the touch 777 moves from the 21st touch position 777*a* in the downward direction 777*c*, the electronic device 701 may execute a camera mode B (e.g., continuous shot) in response to the movement of the touch 777.

When the touch 777 moves from the 21st touch position 777*a* in the leftward direction 777*d*, the electronic device 701 may execute a function A (e.g., Wi-Fi connection) in response to the movement of the touch 777. When the touch 777 moves from the 21st touch position 777*a* in the rightward direction 777*e*, the electronic device 701 may execute a function B (e.g., automatic rotation) in response to the movement of the touch 777.

The camera mode A, the camera mode B, the function A, and the function B described above are only exemplary, and may be changed to any executable function or operation by setting.

Figure 17:
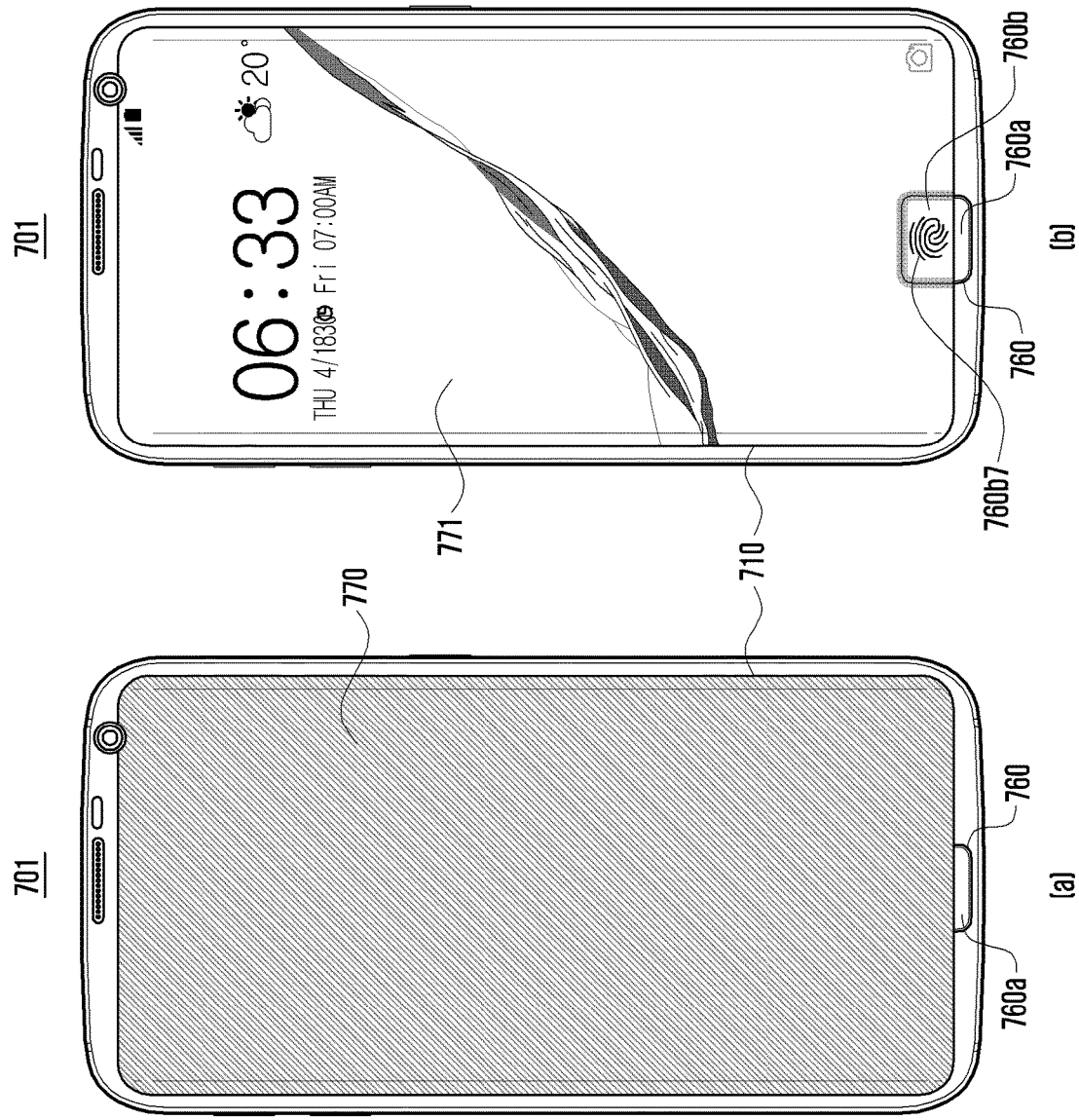
FIGS. 17(a)-(b) is a diagram illustrating an example of a screen having a combined button of an electronic device according to one embodiment.

FIG. 17 is a diagram illustrating an example of a screen having a combined button of an electronic device according to one embodiment.

FIGS. 17(*a*)-(*b*) show a screen-off state 770 and a lock screen 771, respectively. In the screen-off state 770, the virtual button 760*b* of the home button 760 may not be displayed. On the lock screen 771, the virtual button 760*b* of the home button 760 may be displayed. The virtual button 760*b* may have a specific icon 760*b*7 (or text, symbol, etc.) corresponding to the function of the virtual button 760*b*. The virtual button 760*b* of the home button 760 may be displayed or not depending on the state of the electronic device 701 (e.g., a screen turn-off, a screen lock, or a screen wake-up).

According to one embodiment of the present disclosure, an electronic device may comprise a housing including a first surface facing a first direction and a second surface facing a second direction, the first direction being opposite that of the second direction, the first surface including a first opening and a second opening; a touch screen display being disposed and visible through the first opening; a mechanical button located at least in part of the second opening and movable in response to a pressure applied thereto; a processor located inside the housing and electrically coupled to the display and the mechanical button; and a memory located inside the housing and electrically coupled to the processor, wherein the memory stores a plurality of instructions that cause, upon execution, the processor to: display a screen on at least a portion of the touch screen display; display a graphical user interface (GUI) on a specific region of the screen adjacent to the mechanical button such that the GUI visually extends the mechanical button.

According to an embodiment, the mechanical button may have a first shape and the GUI may have a second shape. The second shape may be disposed about the first shape to form a third larger shape. The mechanical button may have a first color and the GUI has a second color, the first and second colors being different. When the processor receives a touch input through the specific region of the screen, a corresponding function associated with the mechanical button is activated in response to the touch input. A fingerprint sensor may be disposed in the specific region where the GUI is displayed.

According to an embodiment, an electronic device may comprise a housing including a first surface facing a first direction and a second surface facing a second direction, the first direction being opposite that of the second direction, the first surface including a first opening and a second opening; a touch screen display being disposed and visible through the first surface; a mechanical button located at least in part of the second opening and movable in response to a pressure applied thereto, the mechanical button having a corresponding function; a processor located inside the housing and electrically coupled to the touch screen display and the mechanical button; and a memory located inside the housing and electrically connected to the processor. The memory stores a plurality of instructions that cause, upon execution, the processor to: display a virtual button on at least a portion of the touch screen display, and display a graphical user interface (GUI) on a specific region of the screen, the virtual button being configured to perform the corresponding function of the mechanical button, wherein the GUI visually enlarges the mechanical button. The mechanical button may have a circular shape and the GUI may have a circular band shape surrounding the mechanical button. The mechanical button has a first color and the GUI has a second color, the first and second colors being different. When the processor receives a touch input through the specific region of the screen, a corresponding function associated with the mechanical button is activated in response to the touch input. A fingerprint sensor may be disposed in the specific region where the GUI is displayed.

It will be understood that the above-described embodiments are examples to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Having described at least one of the preferred embodiments of the present disclosure with reference to the accompanying drawings, it is to be understood that such embodiments are merely exemplary and that the disclosure is not limited to those precise embodiments, and that various changes, modifications, and adaptations may be effected therein by one skilled in the art without departing from the scope or spirit of the disclosure as defined in the appended claims. The scope of the disclosure, therefore, shall be defined solely by the following claims. Further, it will be apparent to those of skill in the art that numerous changes may be made in such details without departing from the spirit and the principles of the disclosure. It should be appreciated that the present disclosure is capable of being embodied in other forms without departing from its essential characteristics.

What is claimed is:

1. An electronic device comprising:
   a touch screen display;
   a combined button including a physical button and a virtual button, the physical button being configured to be movable in response to a pressure applied thereto and the virtual button being configured to be displayed on a specific region of the touch screen display adjacent to the physical button; and
   a processor electrically coupled to the touch screen display and the physical button of the combined button, wherein the processor is configured to:
      display a screen on at least a portion of the touch screen display,
      display the virtual button of the combined button comprising a graphical user interface (GUI) on a specific region of the screen adjacent to the physical button of the combined button such that a first visible boundary of the virtual button contiguously extends a second visible boundary of the physical button of the combined button,
      identify, when a single user gesture is input on the combined button, a first input sensed by the virtual button and a second input sensed by the physical button, and perform corresponding functions according to the first input and the second input.

2. The electronic device of claim 1, wherein the physical button of the combined button has a first shape, and
   wherein the GUI has a second shape, the second shape being disposed about the first shape to form a third larger shape.

3. The electronic device of claim 1, wherein the physical button of the combined button has a first color and the GUI has a second color, the first and second colors being different.

4. The electronic device of claim 1, wherein when the processor receives a touch input through the specific region of the screen, a corresponding function associated with the physical button of the combined button is activated in response to the touch input.

5. The electronic device of claim 1, further comprising:
a fingerprint sensor disposed in the specific region where the GUI is displayed.

6. An electronic device comprising:
a touch screen display;
a combined button including a physical button and a virtual button, the physical button being configured to be movable in response to a pressure applied thereto and having a corresponding function, and the virtual button being configured to be displayed on a specific region of the touch screen display adjacent to the physical button; and
a processor electrically coupled to the touch screen display and the physical button of the combined button,
wherein the processor is configured to:
display a screen on at least a portion of the touch screen display,
display the virtual button of the combined button comprising a graphical user interface (GUI) on a specific region of the screen adjacent to the physical button of the combined button, wherein the virtual button of the combined button has a visible band shape enclosing the physical button of the combined button,
identify, when a single user gesture is input on the combined button, a first input sensed by the virtual button and a second input sensed by the physical button, and
perform corresponding functions according to the first input and the second input.

7. The electronic device of claim 6, wherein the physical button of the combined button has a circular shape, and wherein the virtual button of the combined button has a circular band shape.

8. The electronic device of claim 6, wherein the physical button of the combined button has a first color and the virtual button of the combined button has a second color, the first and second colors being different.

9. The electronic device of claim 6, wherein when the processor receives a touch input through the portion of the touch screen display, a corresponding function associated with the physical button of the combined button is activated in response to the touch input.

10. The electronic device of claim 6, further comprising:
a fingerprint sensor disposed in the portion of the touch screen display where the virtual button is displayed.

* * * * *